US012608377B2

(12) United States Patent
Riaboi et al.

(10) Patent No.: US 12,608,377 B2
(45) Date of Patent: Apr. 21, 2026

(54) SYSTEM AND METHOD FOR BOTTOM UP MULTIDIMENSIONAL DATA ANALYSIS IN COMPLEX FORMULAS TYPES

(71) Applicant: ORACLE INTERNATIONAL CORPORATION, Redwood Shores, CA (US)

(72) Inventors: Sergei Riaboi, Be'er Sheva (IL); Pralhad Katkade, Pune (IN); Natalia Reichman, Be'er Sheva (IL)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 18/898,439

(22) Filed: Sep. 26, 2024

(65) Prior Publication Data

US 2026/0087009 A1     Mar. 26, 2026

(51) Int. Cl.
*G06F 16/2453* (2019.01)
*G06F 16/28* (2019.01)
(52) U.S. Cl.
CPC ...... *G06F 16/24542* (2019.01); *G06F 16/283* (2019.01)
(58) Field of Classification Search
CPC ....................... G06F 16/24542; G06F 16/283
See application file for complete search history.

(56) References Cited

U.S. PATENT DOCUMENTS

| | | | |
|---|---|---|---|
| 5,574,952 A | 11/1996 | Brady | |
| 5,915,129 A | 6/1999 | Slivka | |
| 6,161,105 A | 12/2000 | Keighan | |
| 6,167,396 A | 12/2000 | Lokken | |
| 6,574,720 B1 | 6/2003 | Hopeman | |

(Continued)

FOREIGN PATENT DOCUMENTS

| | | |
|---|---|---|
| WO | 2005111611 | 11/2005 |

OTHER PUBLICATIONS

"Online analytical processing"; Wikipedia, The Free Encyclopedia, Wikimedia Foundation; retrieved Jul. 10, 2025 from: <https://en.wikipedia.org/wiki/Online_analytical_processing>; 7 pages.

(Continued)

*Primary Examiner* — Dangelino N Gortayo
(74) *Attorney, Agent, or Firm* — TUCKER ELLIS LLP

(57) ABSTRACT

Described herein are systems and methods for use with a multidimensional database environment, for providing bottom-up multidimensional data analysis in complex formula types. Complex formulas expressions with conditional branches executed over very sparse regions can result in large computational overheads when the iteration is performed in a top-down mode without a knowledge of the target multidimensional cells that have real base data for evaluation. In accordance with an embodiment, the system employs a bottom-up approach that allows identification of those target cells having real data, and executes only those intersections for complex multidimensional expression evaluation. The bottom-up query path functionality can be activated in autonomous mode. The described approach minimizes the amount of redundant executions that have no base data, in some instances to zero level.

20 Claims, 14 Drawing Sheets

(56) References Cited

U.S. PATENT DOCUMENTS

| | | | |
|---|---|---|---|
| 6,629,102 | B1 | 9/2003 | Malloy |
| 6,766,325 | B1 | 7/2004 | Pasumansky |
| 7,133,876 | B2 | 11/2006 | Roussopoulos |
| 7,222,130 | B1 | 5/2007 | Cras |
| 7,392,242 | B1 | 6/2008 | Baccash |
| 8,082,239 | B2 | 12/2011 | Yang |
| 8,156,083 | B2 | 4/2012 | Banerjee |
| 8,484,252 | B2 | 7/2013 | Grosset |
| 9,081,830 | B1 | 7/2015 | Stolte |
| 9,390,082 | B1 | 7/2016 | Stolte |
| 10,083,195 | B2 | 9/2018 | Zhou |
| 10,318,498 | B2 | 6/2019 | Tran |
| 10,346,435 | B2 | 7/2019 | Walker |
| 10,360,527 | B2 | 7/2019 | Abe |
| 10,467,251 | B2 | 11/2019 | Menon |
| 10,552,393 | B2 | 2/2020 | Reichman |
| 10,909,178 | B2 | 2/2021 | Shore |
| 10,984,020 | B2* | 4/2021 | Roytman ............... G06F 16/245 |
| 11,144,361 | B2 | 10/2021 | Menon |
| 11,188,554 | B2 | 11/2021 | Ramaiyer |
| 11,200,223 | B2 | 12/2021 | Katkade |
| 11,531,662 | B2 | 12/2022 | Reichman |
| 11,768,825 | B2 | 9/2023 | Katkade |
| 11,797,559 | B2 | 10/2023 | Ramaiyer |
| 2002/0029207 | A1 | 3/2002 | Bakalash |
| 2003/0005420 | A1 | 1/2003 | Ghosh |
| 2004/0054858 | A1 | 3/2004 | Chandrasekaran |
| 2005/0262108 | A1 | 11/2005 | Gupta |
| 2006/0010159 | A1 | 1/2006 | Mirchandani |
| 2006/0085742 | A1 | 4/2006 | Harold |
| 2006/0106769 | A1 | 5/2006 | Gibbs |
| 2006/0271568 | A1 | 11/2006 | Balkir |
| 2007/0027674 | A1 | 2/2007 | Parson |
| 2007/0061344 | A1 | 3/2007 | Dickerman |
| 2007/0088691 | A1 | 4/2007 | Dickerman |
| 2007/0094668 | A1 | 4/2007 | Jacquot |
| 2008/0133568 | A1 | 6/2008 | Grosset |
| 2008/0288524 | A1 | 11/2008 | Dumitru |
| 2009/0030915 | A1 | 1/2009 | Winter |
| 2009/0198663 | A1 | 8/2009 | Yang |
| 2009/0248651 | A1 | 10/2009 | Perry |
| 2009/0249125 | A1 | 10/2009 | Bhatawdekar |
| 2009/0276705 | A1 | 11/2009 | Ozdemir |
| 2014/0046920 | A1 | 2/2014 | Shuma |
| 2014/0122413 | A1 | 5/2014 | Presti |
| 2016/0259832 | A1 | 9/2016 | Shore |
| 2016/0335318 | A1* | 11/2016 | Gerweck ............... G06F 16/283 |
| 2017/0116032 | A1 | 4/2017 | Tran |
| 2017/0116215 | A1 | 4/2017 | Ramaiyer |
| 2017/0116281 | A1 | 4/2017 | Roytman |
| 2017/0116290 | A1 | 4/2017 | Reichman |
| 2017/0116309 | A1 | 4/2017 | Menon |
| 2017/0116310 | A1 | 4/2017 | Walker |
| 2017/0116311 | A1 | 4/2017 | Reichman |
| 2017/0116312 | A1 | 4/2017 | Reichman |
| 2017/0116313 | A1 | 4/2017 | Roytman |
| 2019/0073366 | A1 | 3/2019 | Raimaiyer |
| 2019/0079959 | A1 | 3/2019 | Raimaiyer |
| 2019/0102445 | A1 | 4/2019 | Raimaiyer |
| 2019/0102446 | A1 | 4/2019 | Raimaiyer |
| 2019/0102447 | A1 | 4/2019 | Raimaiyer |
| 2019/0258612 | A1 | 8/2019 | Tran |
| 2019/0286638 | A1 | 9/2019 | Walker |
| 2020/0050496 | A1 | 2/2020 | Menon |
| 2020/0125550 | A1 | 4/2020 | Katkade |
| 2020/0226117 | A1* | 7/2020 | Mutalik Desai .... G06F 16/2455 |
| 2022/0012093 | A1* | 1/2022 | Crabtree ............. G06F 16/2453 |
| 2022/0012242 | A1* | 1/2022 | Dosch ................. G06F 16/2246 |
| 2022/0067026 | A1 | 3/2022 | Katkade |
| 2025/0124028 | A1* | 4/2025 | Wang ................ G06F 16/24542 |

OTHER PUBLICATIONS

"Comparison of OLAP servers"; Wikipedia, The Free Encyclopedia, Wikimedia Foundation; retrieved Jul. 10, 2025 from: <https://en.wikipedia.org/wiki/Comparison_of_OLAP_servers>; 11 pages.

"Multidimensional analysis"; Wikipedia, The Free Encyclopedia, Wikimedia Foundation; retrieved Jul. 10, 2025 from: <https://en.wikipedia.org/wiki/Multidimensional_analysis>; 1 page.

Oracle, Oracle Essbase 21c—Get Started, 2 pages, retrieved Jul. 10, 2025 from: <https://docs.oracle.com/en/database/other-databases/essbase/21/index.html>; 2 pages.

Oracle, "Database Administrator's Guide for Oracle Essbase", 2 pages, retrieved Jul. 10, 2025 from: <https://docs.oracle.com/en/database/other-databases/essbase/21/essdm/understanding-multidimensional-databases.html>.

Iankovszky, Andra et al., Edgewater Ranzal, Oracle Platinum Consulting Partner, "The Uncharted Territory Ready to be Discovered: Hybrid Essbase", Hyperion Ukoug, Jun. 18, 2015, 24 pages.

Russakovsky, Alexander, "Hopping over Big Data: Accelerating Ad-hoc OLAP Queries with Grasshopper Algorithms" published Feb. 26, 2015, 30 pages.

"Dynamic Flow process" definition, retrieved from https://www.google.com, Nov. 26, 2018, 2 pages.

Dynamic Flow process OLAP, retrieved from https://www.google.com, Nov. 26, 2018, 2 pages.

PerformanceArchHowTo, "Aggregate Storage Option ASO vs Block Storage Option BSO Contrast and Comparison" Aug. 24, 2011, retrieved from https://www.youtube.com/watch?v=i8AeH5UGT90, Nov. 26, 2018, 2 pages.

ORACLE ©, Oracle Enterprise Performance Management System Documentation, Release 11.1.2.4/ Essbase, Database Administrator's Guide, Developing Formulas for Block Storage Databases, Copyright © 2019, 28 pages.

Larimer, Mike et al., ORACLE, OAC Essbase Hybrid Block Storage Option Performance Tuning, White Paper, Oracle ©, Jun. 11, 2018, 24 pages.

Oracle, Oracle® Cloud, Oracle Cloud Administering Oracle Essbase Cloud, Copyright © 1996, 2016, 632 pages.

Oracle, Oracle® Cloud, Administering Oracle Analytics Cloud—Essbase, Copyright © 1996, 2017, 703 pages.

Essbase Information Development Team, Oracle® Cloud, Technical Reference for Oracle Analytics Cloud—Essbase, E70189-04, Sep. 2017, Copyright © 1996, 2017, 1044 pages.

Epm Information Development Team, Oracle® Essbase Release 11.1.1, Database Administrator's Guide, Copyright © 1996, 2008, 1182 pages.

Epm Information Development Team, Oracle® Essbase, Technical Reference, Release 11.1.2.2.100, Copyright © 1996, 2012, 1402 pages.

Epm Information Development Team, Oracle® Essbase Database Administrator's Guide, Release 11.1.2.2.100, Updated Dec. 2013, Copyright © 1996, 2013, 1138 pages.

Turrell, Jake, "Introduction to Essbase Hybrid Aggregation Mode", Mar. 4, 2015, retrieved from: <http://turrellconsulting.com/blog/?s=introduction+to+essbase+hybrid+aggregation+mode&searchsubmit=U>, on Jan. 15, 2020, 12 pages.

Oracle, Oracle® Business Intelligence Cloud Service Data Sync, Getting Started, Release 2.2, Sep. 2016, Copyright © 2010, 2016, 6 pages.

Oracle, Oracle® Business Intelligence Cloud Service Data Sync, Read Me, Release 2.2, Sep. 2016, Copyright ©2016, 6 pages.

Harvey, Rosie et al., ORACLE® Cloud, Preparing Data in Oracle Business Intelligence Cloud Service, E64760-07, Feb. 2017, Copyright © 2014, 2017, 282 pages.

Williams, Richard, "Configuring the Data Sync Tool for BI Cloud Service (BICS)", Apr. 24, 2015, 20 pages.

Oracle, Loading Data with Oracle BI Cloud Service Data Sync, Tutorial, Copyright © 2015, 34 pages.

* cited by examiner

Function F 406
(@PRIOR)

430

Function E 405
(@CURRMBR)

Function D 404
(@NAME)

Function C 403
(@CONCATENATE)

Function A 401
(@WeightedSumX)

420

Function B 402
(@RANGE)

Function A 401
(@WeightedSumX)

410

| | Jan | | | Test | | Scenario | | | |
| | | New York | Massachu | Florida | | | Connectic | New Ham | East |
| Cola | 1812 | | | 0 | | 0 | 0 | 0 | 2105 |
| Old Fashioned | 647 | | | 0 | | 0 | 0 | 0 | 1853 |
| Dark Cream | 999 | | | 0 | | 0 | 0 | 0 | 1609 |
| Grape | 582 | | | 0 | | 0 | 0 | 0 | 1213 |

| Product | Scenario Test Jan New York | Scenario Test Jan Massachu | Scenario Test Jan Florida | Scenario Test Jan Connectic | Scenario Test Jan New Ham | Scenario Test Jan East | Scenario Sales Jan New York | Scenario Sales Jan Massachu | Scenario Sales Jan Florida | Scenario Sales Jan Connectic | Scenario Sales Jan New Ham | Scenario Sales Jan East |
|---|---|---|---|---|---|---|---|---|---|---|---|---|
| Cola | 1812 | 0 | 0 | 0 | 0 | 2105 | 678 | 494 | 218 | 310 | 120 | 1812 |
| Diet Cola | 200 | 0 | 0 | 0 | 0 | 2105 | #Missing | #Missing | 200 | #Missing | 99 | 200 |
| Caffeine Free Cola | 99 | 0 | 0 | 0 | 0 | 2105 | #Missing | #Missing | #Missing | #Missing | 213 | 99 |
| Colas | 2105 | 0 | 0 | 0 | 0 | 6780 | 678 | 434 | 410 | 310 | 90 | 2105 |
| Old Fashioned | 647 | 0 | 0 | 0 | 0 | 1853 | 61 | 126 | 190 | 180 | #Missing | 647 |
| Diet Root Beer | 310 | 0 | 0 | 0 | 0 | 1853 | #Missing | #Missing | 100 | 130 | #Missing | 310 |
| Sasparilla | #Missing | 0 | 0 | 0 | 0 | 1853 | #Missing | #Missing | #Missing | #Missing | #Missing | #Missing |
| Birch Beer | 896 | 0 | 0 | 0 | 0 | 1853 | 490 | 341 | #Missing | #Missing | 65 | 896 |
| Root Beer | 1853 | 0 | 0 | 0 | 0 | 6780 | 551 | 467 | 370 | 310 | 135 | 1853 |
| Dark Cream | 999 | 0 | 0 | 0 | 0 | 1609 | 483 | 130 | 120 | 190 | 76 | 999 |
| Vanilla Cream | 500 | 0 | 0 | 0 | 0 | 1609 | 180 | #Missing | 150 | 170 | #Missing | 500 |
| Diet Cream | 110 | 0 | 0 | 0 | 0 | 1609 | #Missing | #Missing | 110 | #Missing | #Missing | 110 |
| Cream Soda | 1609 | 0 | 0 | 0 | 0 | 6780 | 663 | 130 | 380 | 380 | 76 | 1609 |
| Grape | 562 | 0 | 0 | 0 | 0 | 1213 | 234 | 88 | 80 | 121 | 45 | 562 |
| Orange | 219 | 0 | 0 | 0 | 0 | 1213 | 219 | #Missing | #Missing | #Missing | #Missing | 219 |
| Strawberry | 432 | 0 | 0 | 0 | 0 | 1213 | 134 | 80 | 81 | 94 | 43 | 432 |
| Fruit Soda | 1213 | 0 | 6 | 0 | 0 | 6780 | 587 | 160 | 161 | 217 | 88 | 1213 |
| Diet Cola | 200 | 0 | 0 | 0 | 0 | 2105 | #Missing | #Missing | 200 | #Missing | #Missing | 200 |
| Diet Root Beer | 310 | 0 | 0 | 0 | 0 | 1853 | #Missing | #Missing | 100 | 130 | #Missing | 310 |
| Diet Cream | 110 | 0 | 0 | 0 | 0 | 1609 | #Missing | #Missing | 110 | #Missing | #Missing | 110 |
| Diet Drinks | 620 | 0 | 0 | 0 | 0 | 6780 | #Missing | #Missing | 490 | 130 | #Missing | 620 |
| Product | 6780 | 0 | 0 | 0 | 0 | 6780 | 2479 | 1251 | 1321 | 1197 | 532 | 6780 |

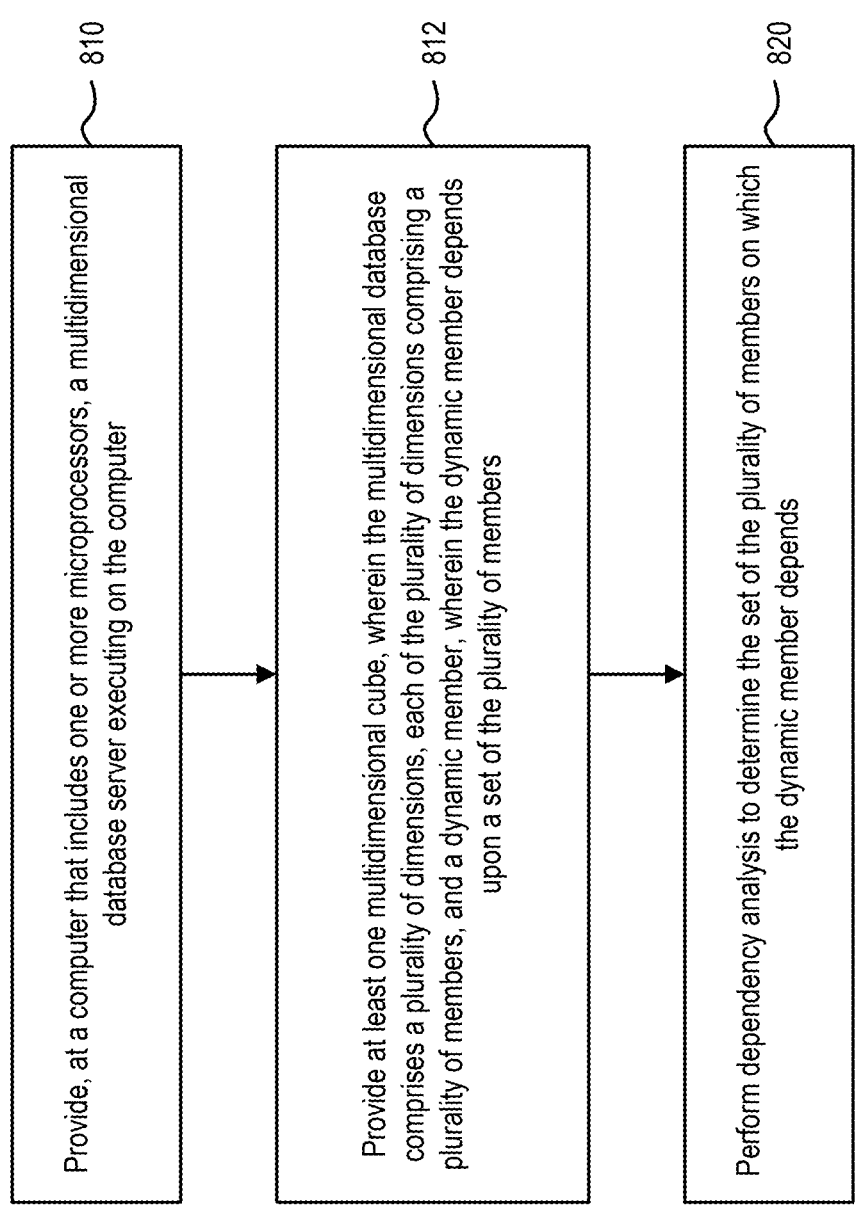

810

Provide, at a computer that includes one or more microprocessors, a multidimensional database server executing on the computer

812

Provide at least one multidimensional cube, wherein the multidimensional database comprises a plurality of dimensions, each of the plurality of dimensions comprising a plurality of members, and a dynamic member, wherein the dynamic member depends upon a set of the plurality of members

820

Perform dependency analysis to determine the set of the plurality of members on which the dynamic member depends

FIGURE 8

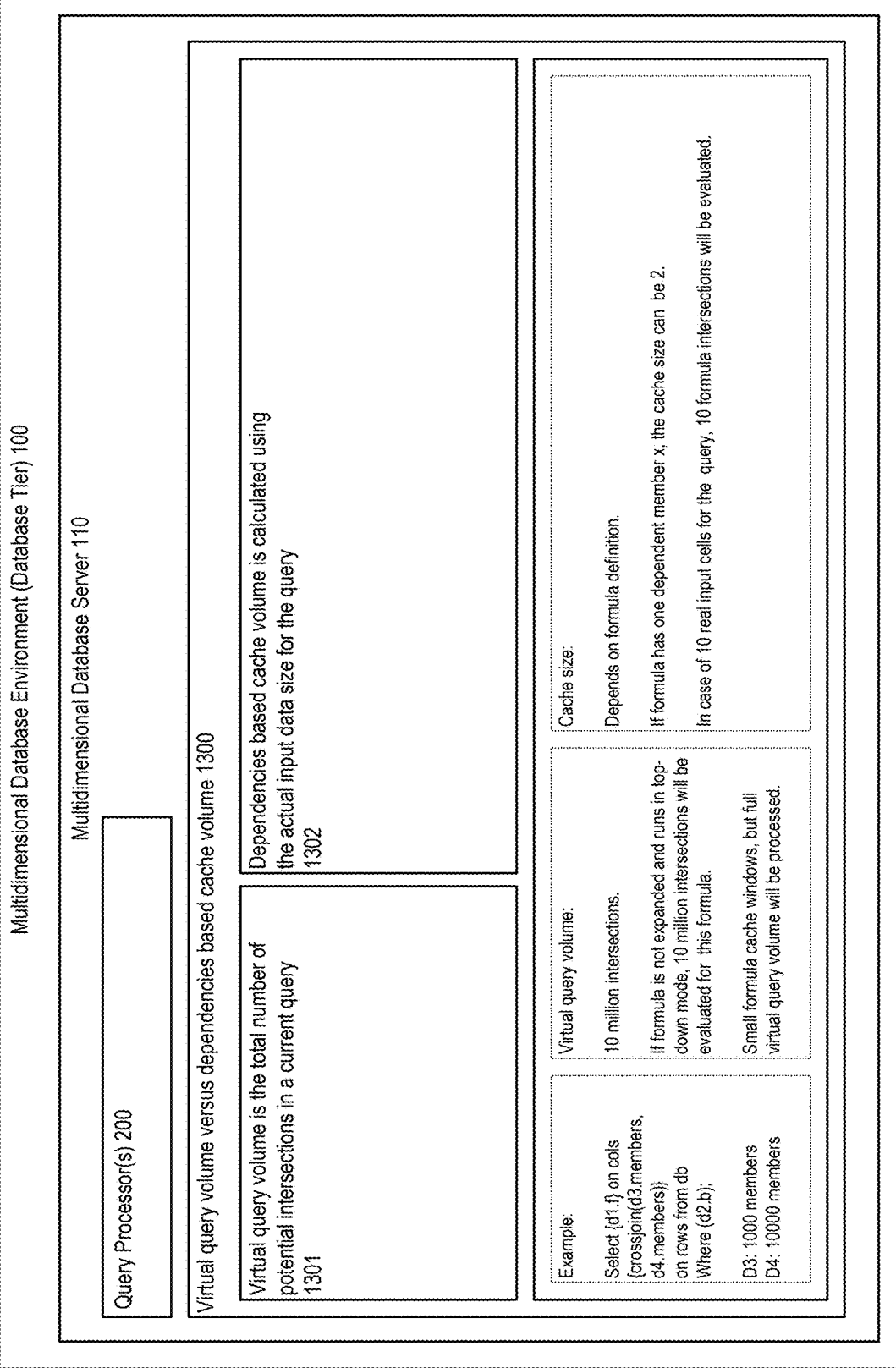

Multidimensional Database Environment (Database Tier) 100

Multidimensional Database Server 110

Query Processor(s) 200

Virtual query volume versus dependencies based cache volume 1300

Virtual query volume is the total number of potential intersections in a current query 1301

Dependencies based cache volume is calculated using the actual input data size for the query 1302

Example:

Select {d1.f} on cols {crossjoin(d3.members, d4.members)} on rows from db Where (d2.b);

D3: 1000 members
D4: 10000 members

Virtual query volume:

10 million intersections.

If formula is not expanded and runs in top-down mode, 10 million intersections will be evaluated for this formula.

Small formula cache windows, but full virtual query volume will be processed.

Cache size:

Depends on formula definition.

If formula has one dependent member x, the cache size can be 2.

In case of 10 real input cells for the query, 10 formula intersections will be evaluated.

FIGURE 13

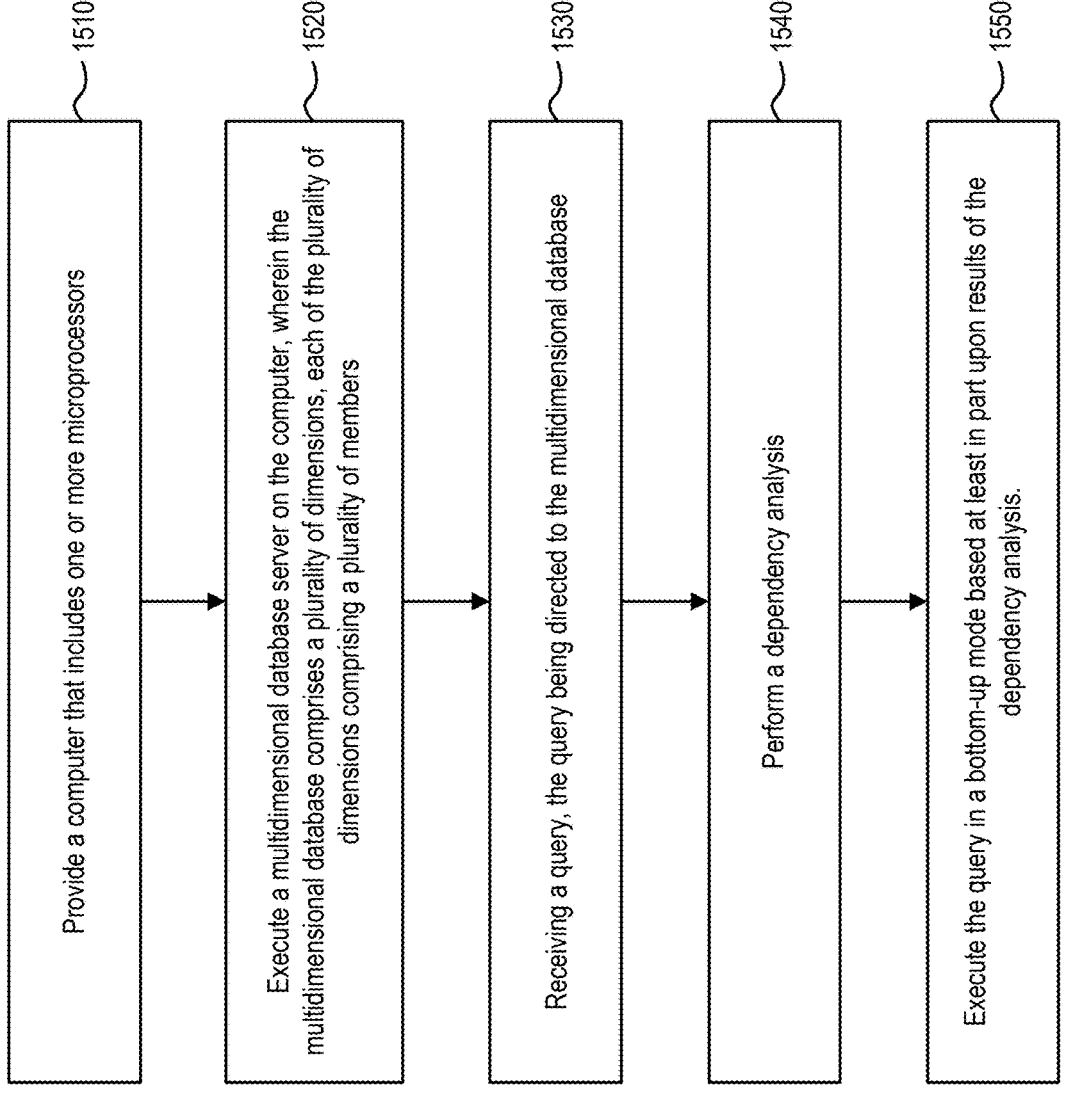

1510

Provide a computer that includes one or more microprocessors

1520

Execute a multidimensional database server on the computer, wherein the multidimensional database comprises a plurality of dimensions, each of the plurality of dimensions comprising a plurality of members

1530

Receiving a query, the query being directed to the multidimensional database

1540

Perform a dependency analysis

1550

Execute the query in a bottom-up mode based at least in part upon results of the dependency analysis.

*FIGURE 15*

SYSTEM AND METHOD FOR BOTTOM UP MULTIDIMENSIONAL DATA ANALYSIS IN COMPLEX FORMULAS TYPES

COPYRIGHT NOTICE

CROSS-REFERENCE TO RELATED APPLICATIONS

This application is related to U.S. patent application Ser. No. 15/332,948, filed Oct. 24, 2016, subsequently issued as U.S. Pat. No. 10,552,393, titled "SYSTEM AND METHOD FOR USE OF A DYNAMIC FLOW IN A MULTIDIMENSIONAL DATABASE ENVIRONMENT", on Feb. 4, 2020; U.S. patent application Ser. No. 16/735,448, filed Jan. 6, 2020, subsequently issued as U.S. Pat. No. 11,531,662, titled "SYSTEM AND METHOD FOR USE OF A DYNAMIC FLOW IN A MULTIDIMENSIONAL DATABASE ENVIRONMENT", on Dec. 20, 2022; and U.S. patent application Ser. No. 16/439,532, filed Jun. 12, 2019, subsequently issued as U.S. Pat. No. 11,200,223, titled "SYSTEM AND METHOD FOR DEPENDENCY ANALYSIS IN A MULTIDIMENSIONAL DATABASE ENVIRONMENT", on Dec. 14, 2021; each of which above patent applications and patents, and the contents thereof are herein incorporated by reference.

TECHNICAL FIELD

Embodiments of the invention are generally related to multidimensional database computing environments, and multidimensional data analysis, and are particularly related to systems and methods for providing bottom-up multidimensional data analysis in complex formula types.

BACKGROUND

Multidimensional database environments enable companies to deliver business analytics to address various use cases, including the ability to leverage and integrate data from multiple existing data sources, and distribute analytical information to end-users in a format that best meets those users' needs. A user can interact with and explore the data in real time, along different dimensions, enabling rapid delivery of data analytics or other information.

SUMMARY

In accordance with an embodiment, described herein are systems and methods for use with a multidimensional database environment, for providing bottom-up multidimensional data analysis in complex formula types.

Complex formulas expressions with conditional branches executed over very sparse regions can result in large computational overheads when the iteration is performed in a top-down mode without a knowledge of the target multidimensional cells that have real base data for evaluation.

In accordance with an embodiment, the system employs a bottom-up approach that allows identification of those target cells having real data, and executes only those intersections for complex multidimensional expression evaluation. The bottom-up query path functionality can be activated in autonomous mode. The described approach minimizes an amount of redundant executions that have no base data, in some instances to zero level.

BRIEF DESCRIPTION OF THE DRAWINGS

FIG. 5 shows an exemplary data set, in accordance with an embodiment.

FIG. 8 is another flowchart of an exemplary method for dependency analysis, in accordance with an embodiment.

FIG. 13 illustrates a virtual query volume vs. dependencies based volume cache, in accordance with an embodiment.

FIG. 15 is a flowchart of a method for bottom-up multidimensional data analysis, in accordance with an embodiment.

DETAILED DESCRIPTION

Multidimensional database environments enable companies to deliver business analytics to address various use cases, including the ability to leverage and integrate data from multiple existing data sources, and distribute analytical information to end-users in a format that best meets those users' needs. A user can interact with and explore the data in real time, along different dimensions, enabling rapid delivery of data analytics or other information.

Figure 1:
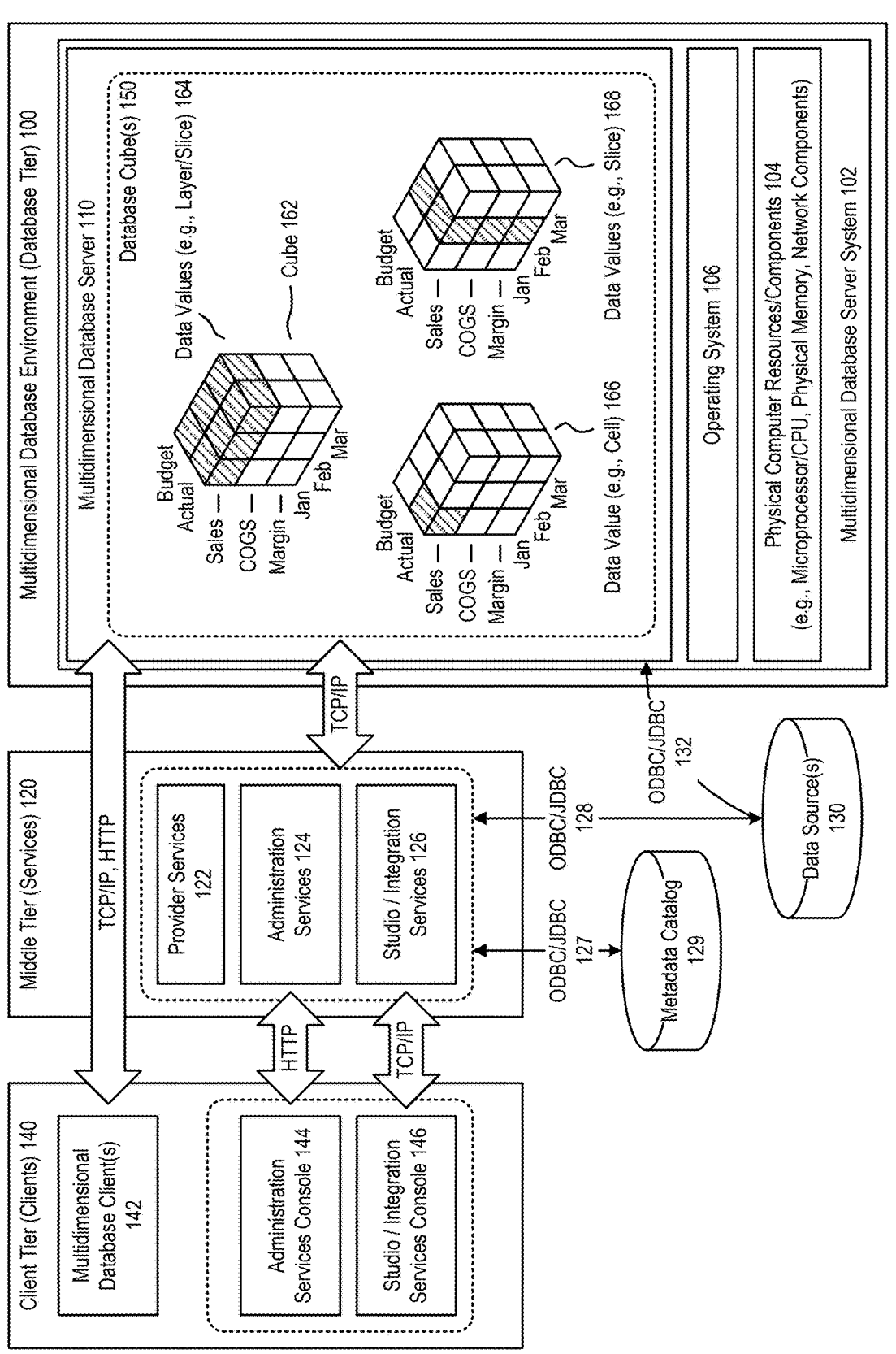
FIG. 1 illustrates an example of a multidimensional database environment, in accordance with an embodiment.

FIG. 1 illustrates an example of a multidimensional database environment 100, in accordance with an embodiment.

As illustrated in FIG. 1, in accordance with an embodiment, a multidimensional database environment, operating as a database tier, can include one or more multidimensional database server system(s) 102, each of which can include physical computer resources or components 104 (e.g., microprocessor/CPU, physical memory, network components), an operating system 106, and one or more multidimensional database server(s) 110 (e.g., Essbase Servers).

In accordance with an embodiment, a middle tier 120 can include one or more service(s), such as, for example, provider services 122, administration services 124 (e.g., Essbase Administration Services), or studio/integration services 126 (e.g., Essbase Studio/Essbase Integration Services). The middle tier can provide access, via ODBC/JDBC 127, 128, or other types of interfaces, to a metadata catalog 129, and/or one or more data source(s) 130 (for example, a relational database), for use with the multidimensional database environment.

In accordance with an embodiment, the one or more data source(s) can also be accessed, via ODBC/JDBC 132, or other types of interfaces, by the one or more multidimensional database server(s), for use in providing a multidimensional database.

In accordance with an embodiment, a client tier 140 can include one or more multidimensional database client(s) 142 (e.g., Essbase Server clients), that enable access to a multidimensional database (such as, for example, Smart View, Spreadsheet Add-in, Smart Search, Administration Services, MaxL, XMLA, CAPI or VB API Applications, Oracle Business Intelligence Enterprise Edition Plus, or other types of multidimensional database clients). The client tier can also include consoles, for use with services in the middle tier, such as for example an administration services console 144, or a studio/integration services console 146.

In accordance with an embodiment, communication between the client, middle, and database tiers can be provided by one or more of TCP/IP, HTTP, or other types of network communication protocols.

In accordance with an embodiment, the multidimensional database server can integrate data from the one or more data source(s), to provide a multidimensional database, data structure, or cube(s) 150, which can then be accessed to provide filtered information to end-users.

Generally, each data value in a multidimensional database is stored in one cell of a cube; and a particular data value can be referenced by specifying its coordinates along dimensions of the cube. The intersection of a member from one dimension, with a member from each of one or more other dimensions, represents a data value.

For example, as illustrated in FIG. 1, which illustrates a cube 162 that might be used in a sales-oriented business application, when a query indicates "Sales", the system can interpret this query as a slice or layer of data values 164 within the database that contains all "Sales" data values, where "Sales" intersect with "Actual" and "Budget". To refer to a specific data value 166 in a multidimensional database, the query can specify a member on each dimension, for example by specifying "Sales, Actual, January". Slicing the database in different ways provides different perspectives of the data; for example, a slice of data values 168 for "February" examines all of those data values for which a time/year dimension is fixed for "February".

Database Outline

In accordance with an embodiment, development of a multidimensional database begins with the creation of a database outline, which defines structural relationships between members in the database, organizes data in the database, and defines consolidations and mathematical relationships.

Within the hierarchical tree or data structure of the database outline, each dimension comprises one or more members, which in turn may comprise other members. The specification of a dimension instructs the system how to consolidate the values of its individual members. A consolidation is a group of members within a branch of the tree.

Cell

In accordance with an embodiment, each single datum (cell), whether existing or not, has its unique "virtual coordinates" in a multidimensional cube. For example, the datum type may be a 64-bit floating-point value Cube In accordance with an embodiment, a cube is defined by several dimensions, and each dimension has several members.

Dimensions

In accordance with an embodiment, a dimension represents the highest consolidation level in the database outline. Dimensions are organized in a tree-shaped structure. The member of the dimension, having the name of the dimension itself, is the top (or default) member of the dimension. The members of the dimension that do not have children, are leaves. If for a specific parent member its children, and subsequent children of children etc., are gathered down to the leaves of one parent, this represents a set of the descendants of this parent. If for a specific child member its parent, and subsequent parent of parent etc., are gathered up to the top of one child, this represents a set of the ascendants of this child.

Standard dimensions may be chosen to represent components of a business plan that relate to departmental functions (e.g., Time, Accounts, Product Line, Market, Division). Attribute dimensions, that are associated with standard dimensions, enable a user to group and analyze members of standard dimensions based on member attributes or characteristics. Members (e.g., Product A, Product B, Product C) are the individual components of a dimension.

Dimension and Member Relationships

In accordance with an embodiment, a multidimensional database uses family (parents, children, siblings; descendants and ancestors); and hierarchical (generations and levels; roots and leaves) terms, to describe the roles and relationships of the members within a database outline.

In accordance with an embodiment, there are several general cases to be considered: the child does not contribute to the parent at all; the value of child is summated to the parent; or the negated value ("minus" value) of child is summated to the parent.

In accordance with an embodiment, a parent is a member that has a branch below it. For example, "Margin" may be a parent for "Sales", and "Cost of Goods Sold" (COGS). A child is a member that has a parent above it. In the above example, "Sales" and "Cost of Goods Sold" are children of the parent "Margin". Siblings are children of the same immediate parent, within the same generation.

In accordance with an embodiment, descendants are members in branches below a parent. For example, "Profit", "Inventory", and "Ratios" may be descendants of Measures; in which case the children of "Profit", "Inventory", and "Ratios" are also descendants of Measures. Ancestors are members in branches above a member. In the above example, "Margin", "Profit", and Measures may be ancestors of "Sales".

In accordance with an embodiment, a root is the top member in a branch. For example, Measures may be the root for "Profit", "Inventory", and "Ratios"; and as such for the children of "Profit", "Inventory", and "Ratios". Leaf (level 0) members have no children. For example, Opening "Inventory", Additions, and Ending "Inventory" may be leaf members.

In accordance with an embodiment, a generation refers to a consolidation level within a dimension. The root branch of the tree is considered to be "generation 1", and generation numbers increase from the root toward a leaf member. Level refers to a branch within a dimension; and are numbered in reverse from the numerical ordering used for generations, with level numbers decreasing from a leaf member toward its root. A user can assign a name to a generation or level and use that name as a shorthand for all members in that generation or level.

Formulas

In accordance with an embodiment, some OLAP implementations may have formulas on one specific dimension or measure; other OLAP implementations support complex multi-dimensional formulas on many dimensions. Formulas can be evaluated using a top-down or bottom-up approach.

Stored vs Dynamic Members

In accordance with an embodiment, a member in a dimension is known to be either dynamic or stored. The implicit rule whether a member is a stored one, or a dynamic one, depends on the OLAP implementation.

Intersection/Cell

In accordance with an embodiment, an intersection is a vector of the cube's dimensionality, where each elements #i belongs to the dimension #i of the cube, to be an intersection/cell in this cube.

Stored Intersection/Cell

In accordance with an embodiment, an intersection is defined as stored if all the dimensions there have a stored member as an element. If at least one dimension has a dynamic member in the intersection, then the intersection is defined as dynamic.

Top-Down vs Bottom-Up Calculation

In accordance with an embodiment, if the calculation traverses over existing data no more than once, and during this pass the necessary dynamic intersections are calculated, this indicates a bottom-up approach. Otherwise, for some formulas where it is necessary to pick formula dependencies each time, this may cause random data access, with duplications, even if the dependent data does not exist; and this indicates a top-down approach.

Aggregation vs Calculation

In accordance with an embodiment, an aggregation is defined as an operation of summation, which is symmetric, can be parallelized relatively easily, and may be computed bottom-up (with one pass over relevant stored data cells). Other calculations such as minus or other formulae are defined as a calculation.

Solve Order

In accordance with an embodiment, the system can compute parent values over several dimensions, where a report will include dynamic members. One dimension may have all pluses, another one may have a formula, and the third one may have all pluses too. In such cases, it may be important to know the dimension solve order in which the dynamic members are computed.

Reports

In accordance with an embodiment, a report may be originally multidimensional, and then prepared for use as for example, a two-dimensional spreadsheet-type report. A multidimensional database language such as MDX (Multidimensional Expressions) allows the use of "SELECT" type clauses to define ad-hoc calculations using "WITH MEMBER" constructs.

Hierarchies

In accordance with an embodiment, a hierarchy is a part of a dimension, having some ascendants and descendants together, with an aggregation relation between them.

Multiple Parents

In accordance with an embodiment, an OLAP implementation may allow multiple parents for the same child. This is typically used for different groupings of the aggregations.

Multiple Contributions

In accordance with an embodiment, an OLAP implementation may allow multiple contributions from one stored member to its ascendant via multiple aggregation paths.

Sparse and Dense Dimensions

Data sets within a multidimensional database often share two characteristics: the data may not be smoothly and uniformly distributed; and data may not exist for a majority of member combinations.

In accordance with an embodiment, to address this, the system can recognize two types of standard dimensions: sparse dimensions and dense dimensions. A sparse dimension is one with a relatively low percentage of available data positions filled; while a dense dimension is one in which there is a relatively high probability that one or more cells is occupied in every combination of dimensions. Some multidimensional databases are inherently sparse, in that they lack data values for the majority of member combinations.

Data Blocks and the Index

In accordance with an embodiment, the multidimensional database uses data blocks and an index to store and access data. The system can create a multidimensional array or data block for each unique combination of sparse standard dimension members, wherein each data block represents the dense dimension members for its combination of sparse dimension members.

In accordance with an embodiment, an index is created for each data block, wherein the index represents the combinations of sparse standard dimension members and includes an entry or pointer for each unique combination of sparse standard dimension members for which at least one data value exists. When the multidimensional database server searches for a data value, it can use the pointers provided by the index to locate the appropriate data block; and, within that data block, locate the cell containing the data value.

Administration Services

In accordance with an embodiment, an administration service (e.g., Essbase Administration Services) provides a single-point-of-access that enables a user to design, develop, maintain, and manage servers, applications, and databases.

Studio

In accordance with an embodiment, a studio (e.g., Essbase Studio) provides a wizard-driven user interface for performing tasks related to data modeling, cube designing, and analytic application construction.

Spreadsheet Add-in

In accordance with an embodiment, a spreadsheet add-in integrates the multidimensional database with a spreadsheet, which provides support for enhanced commands such as Connect, Pivot, Drill-down, and Calculate.

Integration Services

In accordance with an embodiment, an integration service (e.g., Essbase Integration Services), provides a metadata-driven environment for use in integrating between the data stored in a multidimensional database and data stored in relational databases.

Provider Services

In accordance with an embodiment, a provider service operates as a data-source provider for Java API, Smart View, and XMLA clients.

Smart View

In accordance with an embodiment, a smart view provides a common interface for, e.g., Financial Management, Planning, or Enterprise Performance Management Workspace data.

Developer Products

In accordance with an embodiment, developer products enable the rapid creation, management, and deployment of tailored enterprise analytic applications.

Lifecycle Management

In accordance with an embodiment, a lifecycle management (e.g., an Enterprise Performance Management System Lifecycle Management) provides a means for enabling enterprise performance management products to migrate an application, repository, or individual artifacts across product environments.

OLAP

In accordance with an embodiment, an online analytical processing (OLAP) component provides an environment that enables users to analyze enterprise data. For example, finance departments can use OLAP for applications such as budgeting, activity-based costing, financial performance analysis, and financial modeling, to provide "just-in-time" information.

In accordance with an embodiment, OLAP systems can organize data in multiple dimensions, which allows searchers/users of the data set to conduct directed searches that traverse various dimensions to ultimately arrive at the result of interest. Such OLAP systems can view data as residing at the intersection of dimensions. The data underlying OLAP systems can be organized and stored as a multi-dimensional database which is an instantiation of the cross-product of all of the dimensions. This allows users/searchers to traverse hierarchies of detail along dimensions of interest in an ad hoc manner to get at specific, targeted data. Slowly changing data can be represented as metadata within a current data set.

I. Hybrid and Dynamic Flow

In accordance with an embodiment, the system supports the use of a dynamic flow (referred to herein in some examples as Query Processing Dynamic Flow (QPDF)) in a multidimensional database (e.g., Essbase) computing environment. The dynamic flow process enables hybrid use of, for example, Aggregate Storage Option (ASO), Block Storage Option (BSO), or other types of storage containers, and provides a common flow to process a received input query in bottom-up mode. The approach can be used to reduce the size of the cube, which provides for efficient calculation of dynamic members.

For example, in accordance with an embodiment, for queries accessing dynamic sparse members, the system can use an aggregate storage engine to satisfy the request. For queries that cannot be processed by the aggregate storage engine, the system can employ a block storage engine to satisfy the request, including for example bringing the data into an aggregate storage temporary tablespace.

For example, in accordance with an embodiment, when executed by a computer system, the dynamic flow process can operate upon a multidimensional database to: (1) expand an input query to find all base/calculated data; (2) analyze the expanded query to find dependencies and an order of calculation; (3) define calculation units according to the preceding steps; (4) build a processing flow with the defined calculation units, and connect them; and (5) execute the processing flow, and determine a response to the input query.

Figure 2:
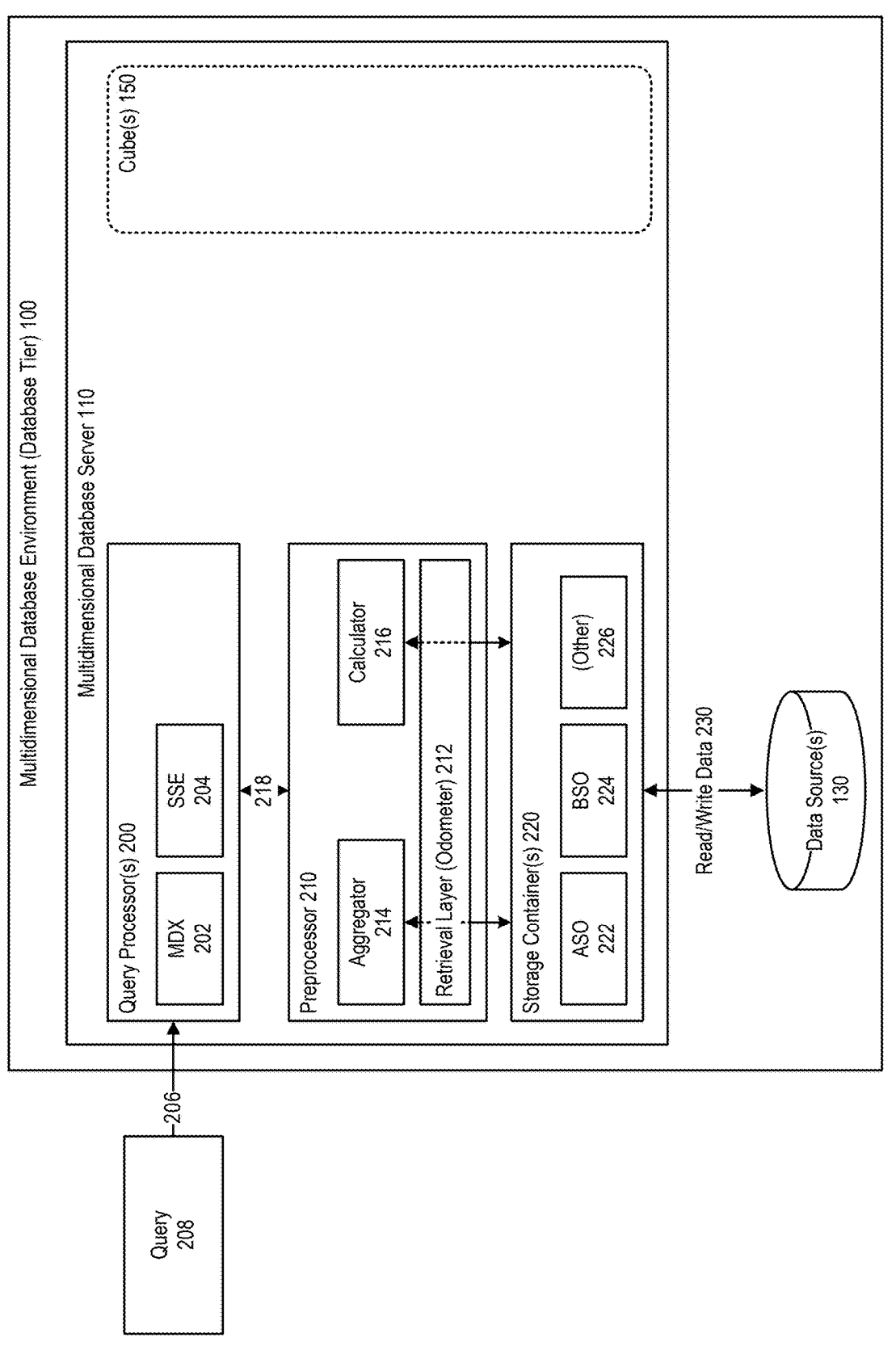
FIG. 2 illustrates use of a dynamic flow with a multidimensional database, in accordance with an embodiment.

FIG. 2 illustrates use of a dynamic flow with a multidimensional database, in accordance with an embodiment.

In a typical multidimensional environment, in order to prepare the system to respond to input queries, the database server pre-calculates values for certain dimensions, and stores those pre-calculated values in the cube for later lookup.

In accordance with an embodiment, when a dynamic flow is instead used, the ability to support dynamic query processing enables the database server to avoid pre-calculating and storing such values, which improves performance and reduces the storage of potentially empty cells.

As illustrated in FIG. 2, in accordance with an embodiment, the system can include one or more query processor(s) 200, for example a Multidimensional Expressions (MDX) query processor 202, and/or a SpreadSheet Extractor (SSE) 204 query processor, that enable receipt 206 of an input query 208 from a client, to retrieve, access, or otherwise examine a set of data from a data source, as provided by and made accessible via the multidimensional database.

In accordance with an embodiment, a preprocessor component 210 can include a data retrieval layer 212 or data fetching component (which in some environments can incorporate a kernel-based odometer retriever, or odometer or data structure stored in memory that manages pointers to data blocks, contains control information, or otherwise acts as an array of arrays of pointers to stored members), an aggregator component 214, and a calculator component 216, each of these layers and components can be provided as a software or program code that is executable by a computer system.

Generally, described, in accordance with an embodiment, the preprocessor receives 218 input queries, from the one or more query processor(s), for processing against the multidimensional database. The aggregator is adapted to perform hierarchical aggregations of the data. The calculation unit is adapted to perform calculations on the data, and to cooperate with the aggregator, as further described below, to utilize the data retrieval layer (including an odometer as appropriate) to at least one of populate and/or search within a cube, and to process a response to an input query.

In accordance with an embodiment, the system can include one or more storage container(s) 220, such as, for example, one or more of an Aggregate Storage Option (ASO) 222, Block Storage Option (BSO) 224, or other type of storage container 226, each of which storage containers can act as an interface between the data that is read from/written to 230 the data source or multidimensional database, and whichever data might be needed for aggregation and calculation at the preprocessor.

Figure 3:
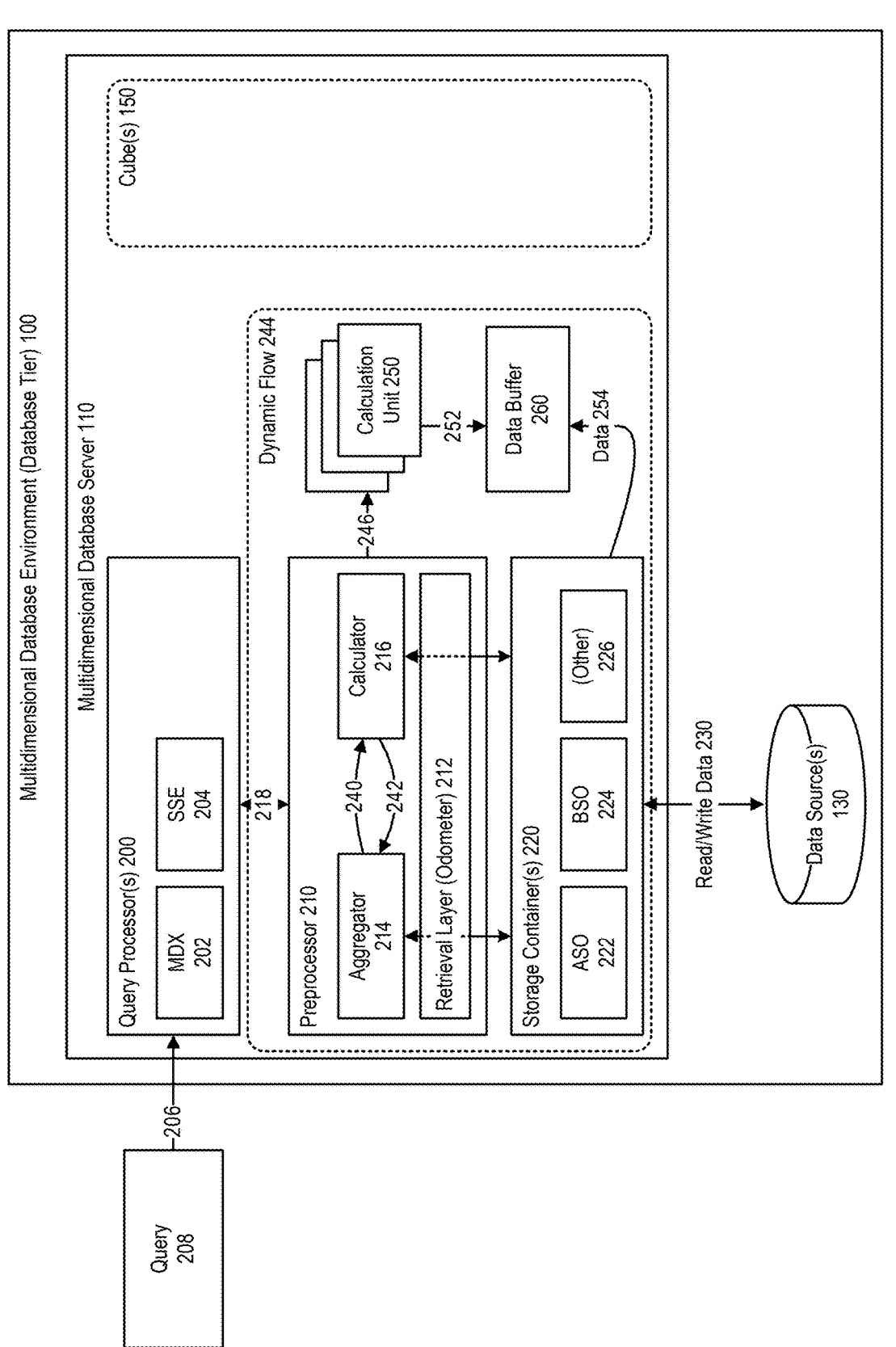
FIG. 3 further illustrates use of a dynamic flow with a multidimensional database, in accordance with an embodiment.

FIG. 3 further illustrates use of a dynamic flow with a multidimensional database, in accordance with an embodiment.

As illustrated in FIG. 3, in accordance with an embodiment, in response to the database server receiving an input query, the aggregator can operate 240, 242 in combination with the calculation unit, to process the query, as part of a dynamic flow 244, which can be similarly provided as software or program code that is executable by a computer system.

For example, as illustrated in FIG. 3, the dynamic flow process enables hybrid use of, in this example, one or more ASO, BSO, or other types of storage containers, and provides a common flow to process the query using these storage containers, in a bottom-up mode.

In accordance with an embodiment, when the system begins to process an input query, it first determines, from an examination of the input query, which particular data or other information needs to be retrieved, i.e., a metadata. The system can then define 246 for that input query, an initial calculation unit 250, which encapsulates an aggregation/calculation process that will retrieve a set of data from the storage container(s).

In accordance with an embodiment, a data buffer 260 (referred to herein, in some examples, as one or more output buckets) operates as a data structure into which each calculation unit can read/write data 252, and which allows for a temporary storage of the data received from 254 the storage container(s), for consumption by calculation unit(s).

In accordance with an embodiment, when the dynamic flow is used with a BSO-type storage container, the dynamic flow process performs a pre-analysis of an input query, and an expansion of asked points to its base data. However, the amount of such expanded base data may be quite large. To address this, and to reduce the volume of expanded data, in accordance with an embodiment, a first dynamic aggregation can be performed during the fetching of data from the kernel, without a full expansion of the associated kernel structure (such as, for example, a kernel-side odometer as described above).

In accordance with an embodiment, the dynamic flow then operates to expand the input query, to find all base/calculated data; and to analyze the expanded query to find dependencies and an order of calculation.

II. Dependency Analysis

In accordance with an embodiment, a multidimensional database (e.g., Essbase) can comprise "m" number of dimensions, each dimension having "n" number of members, wherein each member of a dimension can be stored with loaded input value or dynamic member whose value is calculated at runtime during actual retrieval when this dynamic member is asked in the queries. Dimension members are hierarchical in nature. The cardinality of a dimension can be a total number of dimension members and each combination formulated among all dimension members represents an intersection in a multidimensional database cube. Each cube can have a stored or calculated value associated with it, and each co-ordinate of a combination represents a meaning (e.g., extracted information such as business meaning) to the intersection value.

In accordance with an embodiment, a dynamic member is of a multidimensional database can comprise a member or temporary member (created per request via a language associated with or communicable with the multidimensional database cube, such as MDX with Essbase, a request) that has a valid mathematical formula. Such a formula can be a simple arithmetic or complex formula involving complex conditional calculations of values resulted from calculations of other members from same outline on which this member depends on. Thus, the formula of such dynamic member represents its value and is evaluated for each intersection.

In accordance with an embodiment, a dynamic member may depend on other members from the same outline, which are called as dependents of the formula, and naturally these dependents have to be calculated first in order to evaluate original formula for each intersection. Therefore, to evaluate a dynamic member's formula in a hybrid data aggregation model (e.g., "Hybrid Essbase" (bottom-up)), the system can first have ready a list of all members this formula depends on. Moreover, the list of dependents of a dynamic member may be categorized as "runtime dependents" and "static dependents". Run time dependents of a dynamic member are those dependents that are different for each intersection whereas static dependents are those that are constant irrespective of intersections. This analytical process of identifying runtime as well as static dependents of a dynamic member is termed as "Dependency Analysis" in hybrid data aggregation models.

In accordance with an embodiment, a hybrid aggregation for block storage databases is an aggregation model in which block storage data calculation executes with efficiency similar to that of aggregate storage databases. Hybrid aggregation offers the benefit of fast performance by removing sparse aggregations, reducing size and memory footprint, and speeding up batch routines. The deployment considerations are simplified, as users no longer have to consider using block storage for heavy use of level 0 calculations, versus aggregate storage for many upper-level aggregations, versus designing partitioned models in which the cube is split along dimensional lines to facilitate calculation performance.

In block storage databases, large, sparse dimensions must be stored: making them dynamic would result in too much block I/O at query time, affecting performance. Very large stored sparse dimensions can lead to lengthy batch aggregation times, as well as large database sizes that grow in relation to the number and size of the sparse dimensions. Even with such drawbacks, block storage is widely used for its powerful functionality.

Aggregate storage is designed to enable large databases with more and larger dimensions. Unlike block storage, it does not require large sparse dimensions to be pre-aggregated to achieve good query performance. The key lies in the aggregate storage engine, which facilitates rapid dynamic aggregation across large dimensionality. A hybrid flow utilizes the ASO calculation engine when possible and switches to the BSO calculation engine when needed.

In accordance with an embodiment, dependency analysis can form part of the hybrid flow in a multidimensional database environment, which enables users to evaluate a dynamic member in bottom-up approach by identifying all its required dependents before starting its actual evaluation. The dependency analysis described herein improves performance by eliminating recursive top-down trips redundant and obsolete.

In accordance with an embodiment, dependency analysis is performed for each dynamic (or temporary) member to collect list of runtime as well as static dependents in both BSO (block storage option) and ASO (aggregate storage option) cubes. This enables the member to join hybrid flow for its execution in bottom-up approach.

For the following example, consider a dynamic member with the sample formula that is shown below, which shows an exemplary dynamic member, in accordance with an embodiment. The italic text between lines discusses the functions in the lines above:

1) IF (@ISLEV ("Market", 0) and ((@ISLEV ("SITE", 1)
   If the current member in the user's query is at level 0 of the "Market" dimension, and if the current member in the user's query is at level 1 of the "SITE" dimension.
2) IF (@ISMBR ("New York"))
   And if the current member is "New York"
3) @PARENTVAL ("Market", "Sales");
   Then return the parent value at the dimensions "Market" and "Sales"
4) ELSE
5) 6;
   Else return "6"
6) END IF;
7) ELSE
8) @PARENTVAL ("Product", "Sales");
   If the conditions above are not met, return parent value at the dimensions "Market" and "Sales"
9) ENDIF;

In accordance with an embodiment, following the above dynamic member, there are two main steps to be taken for a dependency analysis. In a first step, during server startup, a dependency analysis is performed based upon the dynamic member. In a second step, the actual dependents are fetched using the results of the first step.

First Step—Perform Dependency Analysis during Server Startup

In accordance with an embodiment, the first step is to detect a list of runtime dependent dimensions and dependency patterns present in the dynamic formula. This logic is executed during server startup, and hence it does not contribute to MDX queries turnaround time during actual retrieval.

In accordance with an embodiment, during load of a cube (e.g., startup of a server) the systems and methods herein can read the entire outline of the cube, each and every member, and look at the formulas for each member to collect the dependents for each member. All of this dependency information is collected during server startup. Because all the dependency information is static, such a gathering step does not rely upon a user query. This dependency mapping can then be stored and called when a query for a dynamic member is called.

In accordance with an embodiment, the input of the first step of the dependency analysis is to break the dynamic formula into a list of tokenized strings. The output of such a step is at least twofold.

In accordance with an embodiment, a first output is an array of dimensions on which the dynamic formula has "run time" dependency. In looking at the example of the dynamic member above, the runtime dependency dimensions are Product and Market. These dimensions will generate, based upon the stored dependency mapping, an exact list of runtime dependent members during actual retrieval of this formula member at run time (e.g., those dimensions, whether static or runtime, that form the dependency mapping for the dependency dimensions Product and Market in the above example).

In accordance with an embodiment, a second output is the detection of any patterns present in the formula which says the list of "context" dependent dimensions used by the formula in its "IF" (conditional logic/conditional statements) conditions is different or same from that used in the body part of each "IF" of the formula. This pattern detection becomes more complex when IF-ELSE nesting is increased in the formula.

In accordance with an embodiment, in the below examples, the terms "cube" or "database" can mean an actual server or cube or database which comprises multiple dimensions, wherein each dimension's members are hierarchical and can be represented in an Outline or tree view. The term "MDX" refers to a multidimensional expression (MDX) which is used in a multidimensional database. The term "top-down" or "runtime dependent function" refers to a function which depends on an actual query and its resultant value is evaluated in the context of the actual running query. There can be a number of top-down functions like: @PARENT, @CURRMBR, etc.

In accordance with an embodiment, taking the example shown above, the high-level output form the first phase would consist of a list of dimensions that the dynamic member depends upon, a determination of whether there exits any IF ELSE patterns are present, and a list of dimensions used in the "IF" conditions only by runtime dependent functions. At a high-level output, the list of dimensions that the example above depends on comprises Market, Product. There are IF ELSE patterns in the example; and the list of dimensions used in the "IF" conditions comprise Market, SITE.

In accordance with an embodiment, the first phase dependency analysis can be provided for as a method in stacks that are created for each query (i.e., function stacks and argument stacks). These stacks can be based upon each call chain in a query.

In accordance with an embodiment, as mentioned above, an input for dependency analysis can be the formula for the query that is broken into a tokenized list. Then, the system can declare all necessary variables used internally and categorize them into respective stacks.

In accordance with an embodiment, the below pseudo-code represents the primary steps taken in the dependency analysis:

```
For each string token in the list of input tokens
Do
    Clear the internal two stacks: function stack and argu-
        ment stack
    Local the first function name entry in the input list
    If first function is found, push it onto the function stack
    While (it is not the end of the current call chain
        (detected by matching number of opening and clos-
        ing arguments, such as parentheses)
    {
    If (token is function name)
    }
        Get the record of the function and store pointer;
        Push the function name record on the function stack
    }
    Else if (token is argument used by function)
    {
        Push the argument on the argument stack
    }
    Else if (token is argument separator)
        Continue
    }
    If (found a call chain to analyze)
    {
        Call function to analyze individual call chain
    }
    Clear the internal two stacks
Done
```

Figures 4, 6:
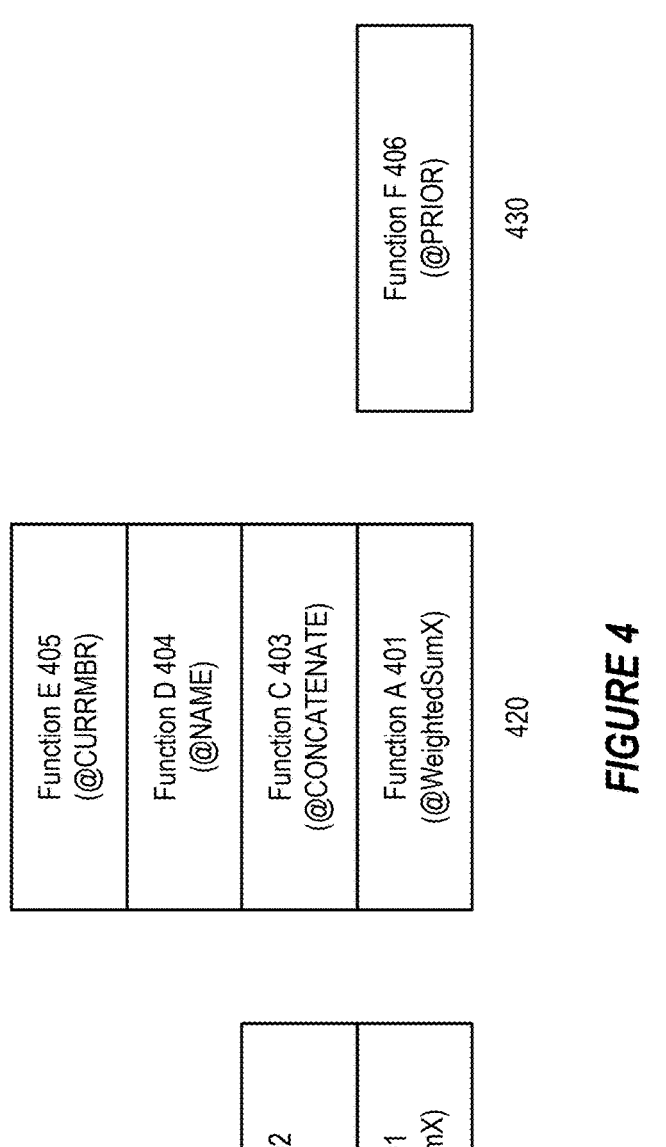
FIG. 4, which shows exemplary function stacks, in accordance with an embodiment.
FIG. 6 shows an exemplary data set, in accordance with an embodiment.

The above pseudocode can next be described in the form of an example. For the following example, the below outline formula can be used with reference to FIG. 4, which shows exemplary function stacks, in accordance with an embodiment.

@WeightedSumX (@Range ("Entered Delta", USD: ZAR), _FCCS_Rates_, "Rate.Average",
@CONCATENATE ("Rate_", @NAME (@CURRMBR (Currency)))+
@PRIOR ("Reporting");

In accordance with an embodiment, as shown in the figure, there are three individual function stacks that result from the above formula.

In accordance with an embodiment, the first function stack 410 comprises Function A (@WeightedSumX) 401 and Function B (@RANGE) 402. This represents the end of the first function call chain, with the remaining values in the call chain, "Entered Delta", and USD: ZAR being arguments, which would be placed in an argument stack.

In accordance with an embodiment, the second function stack 420 comprises Function A (@WeightedSumX) 401, Function C (@CONCATENATE) 403, Function D (@NAME) 404, and Function E (@CURRMBR) 405. This represents the end of the second function call chain, with the remaining values in the call chain, "Rate_", and Currency being arguments, which would be placed in an argument stack.

In accordance with an embodiment, the third function stack 430 comprises Function F (@PRIOR) 406. This represents the end of the third function call chain, with the remaining values in the call chain, "Reporting" being an argument, which would be placed in an argument stack.

In accordance with an embodiment, each call chain in the above example can be analyzed and runtime dimensions can be noted. In the above example, the runtime dimensions are Currency and Reporting. The above example does not contain any IF-ELSE patterns.

Second Phase: Fetch Actual Dependents Using First Phase Outputs

In accordance with an embodiment, once the first phase has been performed (the first phase can be performed once in the life of a cube—during server startup when it is loaded for the first time), the second phase can begin. The described below second phase, used to fetch actual runtime dependents, is specific and depends upon a retrieval request (e.g., MDX query). Therefore, the logic of the actual fetching of dependents is executed for reach retrieval request (i.e., during actual query runtime). The information collected in the first phase of dependency analysis is used for finding and collecting query runtime dependents.

In accordance with an embodiment, in the second phase, the system takes a queries odometer and list of runtime dependents (found from phase one) as its input.

In accordance with an embodiment, the system next takes formulate combinations (or intersections) of members from the odometer of only runtime dependent dimensions detected in phase one.

In accordance with an embodiment, the system, for each intersection, executes the internal precompiled program of the dynamic member to fetch dependent members that are particular and different to each intersection. The systems and methods can then accumulate all dependents found for each intersection as the output and fill it in the expanded odometer of the query. This step goes through the stack machine to evaluate program only for metadata. The multidimensional database knows the execution of the formula program for value retrieval already. However, the approach allows for executing the same formula and only fetching dependent members by skipping value retrieval.

In accordance with an embodiment, consider the dynamic member below. For this example, the dynamic member will be named "Test".

1) IF (@ISLEV ("Market", 0) and (@ISLEV ("SITE", 1)
2) IF (@ISMBR ("New York"))
3) @PARENTVAL ("Market", "Sales");
4) ELSE
5) 6;
6) END IF;
7) ELSE
8) @PARENTVAL ("Product", "Sales");
9) ENDIF;

FIG. 5 shows an exemplary data set, in accordance with an embodiment.

As illustrated within FIG. 5, a number of dimensions are shown, such as market 500, site 510, products 520, and sales 530. For the purposes of the below example, suppose a user has submitted the following request to retrieve a MDX query.

SELECT {[Cola], [Old Fashioned], [Dark Cream], [Grape]}
   ON ROWS, {[East].Children, [East]}
   ON COLUMNS FROM [TPDNTest.TPDNTest]
   WHERE ([January], [Test], [Scenario]);
In accordance with an embodiment, [TPDNTest.TPDNTest] can comprise an internal cube created for testing purposes. Running the dynamic member "Test", can result in the data set shown in FIG. 6.

In accordance with an embodiment, in considering the dynamic member "Test", the first phase (dependency analysis) returned the dimensions Market and Product as the runtime dependency dimensions. The "Test" also has an IF-ELSE pattern. This information, along with the input odometer, is taken as an input by the second phase to fetch the actual runtime dependents. Thus, the newly found dependents, as an output of the second phase, are Sales in the Measures dimension. In addition, there are four members in the Product dimension, namely Colas, Root Beer, Cream Soda, and Fruit Soda.

In accordance with an embodiment, the output can comprise: a first output which is array of dimensions on which this formula has "run time" dependency i.e., two dimensions in above example: Product, Market. These dimensions can generate an exact list of runtime dependent members during actual retrieval of this formula member at run time.

In accordance with an embodiment, a next output is: the detection of pattern present in the formula which says the list of dependent dimensions used by formula in its "IF" conditions are different or not from that used in the body part of each "IF" of the formula. This pattern detection becomes more complex when IF-ELSE nesting is increased in the formula and is an important part of dependency analysis to correctly fetch the dependent members for each intersection at run time.

In accordance with an embodiment, provided below is a summary of the steps of phase 2. The phase 2 can form all mathematical combinations among all the members of runtime dependent dimensions (Market and Product) from the input odometer and execute the program for each combination to fetch dependents.

In accordance with an embodiment, the input odometer members from Market and Product dimensions are:
   Product: {[100-10], [200-10], [300-10], [400-10]} OR {[Cola],
   [Old Fashioned], [Dark Cream], [Grape]} where second set is alias name
   for corresponding product name
   Market: {[New York], [Massachusetts], [Florida], [Connecticut],
   [New Hampshire], [East]}
   In accordance with an embodiment, the total combinations are shown below:
   {([100-10], [New York]), ([100-10], [Massachusetts]),
      ([100-10], [Florida]),
   ([100-10], [Connecticut]), ([100-10], [New Hampshire]),
      ([100-10], [East]),
   ([200-10], [New York]), ([200-10], [Massachusetts]),
      ([200-10], [Florida]),
   ([200-10], [Connecticut]), ([200-10], [New Hampshire]),
      ([200-10], [East]),
   ([300-10], [New York]), ([300-10], [Massachusetts]),
      ([300-10], [Florida]),
   ([300-10], [Connecticut]), ([300-10], [New Hampshire]),
      ([300-10], [East]),
   ([400-10], [New York]), ([400-10], [Massachusetts]),
      ([400-10], [Florida]), ([400-10], [Connecticut]), ([400-10], [New Hampshire]),
([400-10], [East])}

In accordance with an embodiment, phase 2 can then iterate over this list of all combinations, and for each combination, the formula of member "Test" can be evaluated only for fetching dependent members. During the phase 2 the system can add these members, as the dependents, into expanded odometer of Measures, Market, and Product respectively.

{[Sales]}, {[East]}, {[100], [200], [300], [400]}

In accordance with an embodiment, the dependents are collected by an executed formula for metadata once for input odometer. This logic also repeats the same process of formulating combinations and executing the same program for finding more dependents. This time, it formulates combinations among only the newly added members for runtime dependent dimensions.

In accordance with an embodiment, additionally, in order to evaluate a formula for a particular combination, the formula's precompiled executable program, along with the input combination, both can be fed into the stack machine framework, which knows how to evaluate the program. This stack machine can be configured to evaluate a formula for its value and not for fetching only dependent metadata. Therefore, this stack machine is enhanced with a feature which allows the stack machine to take a formula's program along with combination as its input, and execute this program only for fetching metadata as its dependent without invoking the values calculations part of the formula. This mode of stack machine in which the program is executed only for fetching dependents is referred to as "Metadata" mode.

In accordance with an embodiment, phase 2 of the process can execute within a temporary container that can hold the discovered dependent members. This structure can be used to form a dynamically enlargeable list of members and can hold any object created within the multidimensional database.

Figure 7:
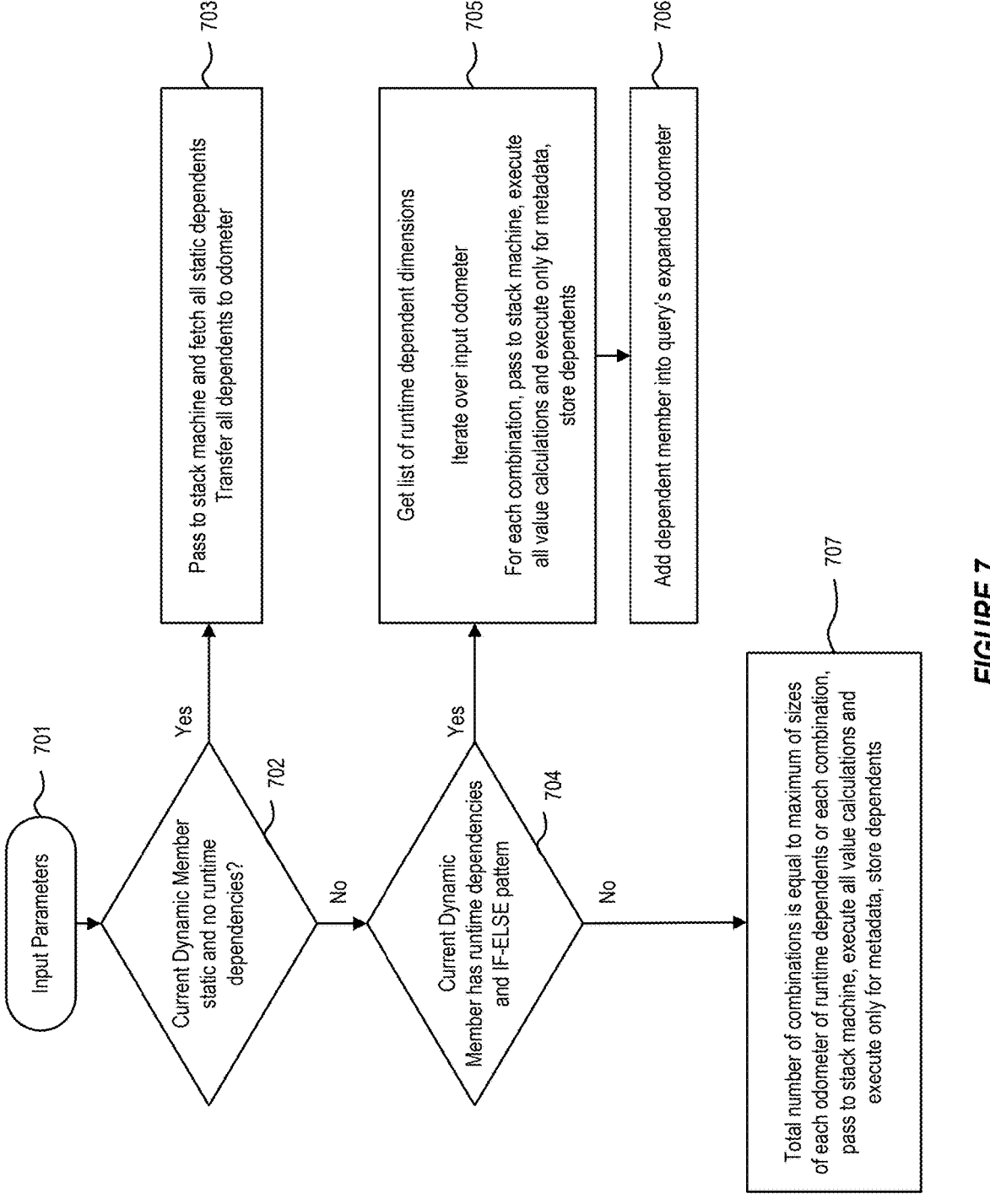
FIG. 7 is a flowchart of an exemplary method for dependency analysis, in accordance with an embodiment.

FIG. 7 is a flowchart of an exemplary method for dependency analysis, in accordance with an embodiment.

In accordance with an embodiment, at step 701, the method can receive input parameters. This includes the dynamic member as well as an odometer, which contains the user's retrieval request.

In accordance with an embodiment, at step 702, the method checks whether the dynamic member is static and does not have runtime dependencies. If so, at step 703, the method passes this formula program to stack machine with default combinations. The method executes the program only for one time for default combination to fetch all the static dependents. Then the method transfers all these dependents from temporary container into odometer.

In accordance with an embodiment, at step 704, the method checks if the dynamic member has runtime dependency and if an IF-ELSE pattern is present in the dynamic member's formula. If so, at step 705, the method gets the list of run time dependent dimensions. The method iterates over the input odometer of run time dependent dimensions. For each combination (total number is =multiplication of size of each odometer) of members from the odometer of run time dependent dimension, the method: passes the current formula program and current combination to stack machine for program execution; while executing program for metadata only, the method excludes all values calculations part from the program and execute only metadata instructions; and the method stores the dependents found from this run of program for current cmi into the temporary container.

In accordance with an embodiment, at this point, the program is executed for all possible combinations and all dependents found are present in the temporary container. Now, iterate over this temporary container.

In accordance with an embodiment, at step 706, the method, for each member in the temporary container, adds the dependent member into the query's expanded odometer.

In accordance with an embodiment, at step 707, the method (which does not need all combinations) instead selects a lesser number of combinations wherein each ordinate appears just once in all combinations. In this case, the total number of combinations is equal to the maximum size of each odometer of run time dependents. The method, for each combination (total number is =maximum of sizes of each odometer) of members from the odometer of run time dependent dimension: passes current formula program and current combination to stack machine for program execution; while executing program for metadata only, the method excludes all values calculations part from the program and execute only metadata instructions; and the method then stores the dependents found from this run of program for current cmi into the temporary container.

In accordance with an embodiment, at this point, the program has executed for all possible combinations and all dependents found are present in the temporary container. Now, the method iterates over this temporary container.

In accordance with an embodiment, for each member in the temporary container, the method adds the dependent member into the query's expanded odometer. All dynamic members are expanded i.e., all required dependents of each dynamic member are known and added into the query's expanded odometer. This expanded odometer is then taken forward by the hybrid flow in a multidimensional database environment, which retrieves the complete odometer in bottom-up approach and sends the expected result to back the user.

FIG. 8 is another flowchart of an exemplary method for dependency analysis, in accordance with an embodiment.

In accordance with an embodiment, at step 810, at a computer that includes one or more microprocessors, a multidimensional database server is provided executing on the computer.

At step 812, at least one multidimensional cube is provided, wherein the multidimensional database comprises a plurality of dimensions, each of the plurality of dimensions comprising a plurality of members, and a dynamic member, wherein the dynamic member depends upon a set of the plurality of members.

At step 820, the method includes performing dependency analysis to determine the set of the plurality of members on which the dynamic member depends.

III. Bottom-up Multidimensional Data Analysis in Complex Formulas

In accordance with an embodiment, described herein are systems and methods for use with a multidimensional database environment, for providing bottom-up multidimensional data analysis in complex formula types.

Complex formulas expressions with conditional branches executed over very sparse regions can result in large computational overheads when the iteration is performed in a top-down mode without a knowledge of the target multidimensional cells that have real base data for evaluation.

In accordance with an embodiment, the system employs a bottom-up approach that allows identification of those target cells having real data and executes only those intersections for complex multidimensional expression evaluation. The bottom-up query path functionality can be activated in autonomous mode. The described approach minimizes the amount of redundant executions that have no base data, in some instances to zero level.

In accordance with an embodiment, the term "asked query intersection" refers to an intersection which is a certain cell in the cube, and which may have value. An "asked query intersection" in accordance with this meaning is a queried cell of the cube. For example, if a cube is defined on three dimensions:

Time: Jan, Feb, Mar, . . . . Dec, Q1, Q2, . . .
Geography: California, Florida, Texas, US.
Product: Drinks, Cola, Fanta, Water, Milk.

Then, in accordance with an embodiment, every combination of a member from these three dimensions can point to a value of the cube:

<January, California, Cola> or
<February, Florida, Milk> or.
Q3, US, Bottled water>

In accordance with an embodiment, a query can cover every one of these cells, or group of the cells. Every cell queried in a particular report is considered an asked query intersection.

In accordance with an embodiment, the term "symmetric regions of targets" can be defined by a combination of terms. A "target" refers to an intersection (i.e., a cell of the cube) which is required to be calculated. Such a target may be explicitly asked in the query or may be required as an intermediate result to calculate the query intersection. A "region" refers to a collection of cells (i.e., intersections) of the cube. A "symmetric region" refers to a region which can be described by a list of members for each dimension, when every possible combination of these members represents a cell of the cube.

In accordance with an embodiment, the term "intersections using solve order" can similarly be defined by a combination of terms. A "solve order" refers to an order defining the order of calculations. The systems and methods can employ a default order using outline order and dimension types. As an example, an Account dimension can be calculated first, followed by other dimensions. Alternatively, the order may be implicitly set by the user. Based on a default solve order of dimensions and a customized solve order set for specific members, the system or the user can "sort" intersections in a particular solve order for calculation.

In accordance with an embodiment, the term "full intersection key" can be defined as a means wherein each intersection (i.e., cell in the cube or query) is identified by members of every dimension. The compact representation of these members is a key which is a unique identifier of the cell (i.e., value) in the cube. The key may be full (i.e., include all of the dimensions) or partial (i.e., include only a sub-set of dimensions). A full key represents a single intersection, whereas a partial key represents a set of intersections.

In accordance with an embodiment, the term "target intersection map" refers to a map holding target intersections as described above. A target intersection map does not refer to values, but rather keys.

In accordance with an embodiment, the term "input cell" refers to a cell with a value from a cube needed to calculate one of the target intersections.

In accordance with an embodiment, for purposes of bottom-up multidimensional data analysis in complex formulas, an "odometer" refers to an array representing a symmetric region of asked query members. For example, an odometer can be represented as an array containing a list of members by each dimension. An original query may be asymmetric and split into several symmetric odometers. Each odometer can be processed as a separate query, and their results can be combined and returned as an output.

In accordance with an embodiment, the term "formula cache" refers to a staging area for formulas calculations. A formula cache can be defined using formula cache dimensions participating in formulas dependencies. The formula cache dimensions can define one or more sub-cubes for evaluation of the formulas list.

For example, for a cube of 5 dimensions and 2 queried formulas, then:

f1=a+b, from dimension d1.
f2=x+y, from dimension d2.
Then both d1 and d2 will be defined as formula cache dimensions.
Remaining cube dimensions d3,d4,d5 are not participating in formulas and therefore will be defined as prefix dimensions.

In accordance with an embodiment, a process of formulas evaluation is performed by iterations and formulas executions inside formula cache windows. Each prefix combination can set a next formula cache window for processing a formula's execution.

In accordance with an embodiment, the term "formula cache window" refers to a data staging area or a formula calculations cycle for a current prefix of non-participating dimensions. Each query calculation can be split by formula cache windows. A first input data is loaded matching the current prefix, and all of the formulas are executed based on this input. Intermediate formulas results are stored in this cache window until all formulas execution ends. Intersections matching output cells can be sent to an output query buffer. The cache window is cleaned/cleared after each cycle of formulas executions.

In accordance with an embodiment, empty cache windows can be skipped in the case that all formulas produce output only for existing data and return nothing on empty inputs.

In accordance with an embodiment, a multidimensional database environment engine query execution comprises the following:

Preprocessing and dependency analysis.
Base data fetch from the source and plain aggregations over dimensions hierarchies.
Calculation of formulas over queried virtual scope using the fetched dependencies data.
The dependencies data is stored in memory in a staging defined by dimensions participating in formulas execution.
Each formula is executed over asked intersections in a query using the dependencies data, and a result is returned to client running the report.

In accordance with an embodiment, in terms of formulas execution that are utilized, the difference between a top-down and bottom-up approach can be characterized as:

A top-down approach refers to an approach where formulas are executed for each asked query intersection, and during formulas execution, the approach determines values of dependent members in the staging area containing base data.

A bottom-up approach refers to an approach where formulas execution is performed in data driven mode—only intersections that have at least one (1) dependency having data value in staging area are actually executed.

Generally, a bottom-up approach is more efficient from the perspective of the amount performed by calculations, but presents issues when the volume of asked multidimensional region is large (e.g., virtual) whereas the dependencies data region is sparse.

By utilizing dependency analysis, the disclosed analysis path can be applied to any type of complex formula that originally was treated as top-down by expanding its dependencies during a preprocessing stage. These dependencies are fetched and stored in the base data staging area to be available during formulas execution.

Dependency expansion significantly reduces the number of I/O operations required for top-down formulas execution. However, in the case of large sparse virtual volumes of asked queries, a top-down execution presents performance issues, since the dependencies awareness is not active in this mode and many redundant formulas executions may be performed. The I/O considerations of top-down executions can be addressed by dependencies expansion, but not the cost of redundant evaluation of formulas that cannot return any data.

In accordance with an embodiment, using dependency analysis as described above, a reverse mapping of dependent members to their targets from different formulas expressions can be generated. Such mappings are dimension based, so each dimension has its own set of such mappings after dependency analysis is completed.

In accordance with an embodiment, the mapping contains links between dependent members to their target member lists. The map structure is members-based rather than inter-sections-based, since otherwise the sparse region overflow problem might be encountered at this level. Members-based mapping allows the systems to use a compact representation of the dependencies at the preprocessing stage, that can be applied later on the data processing stage.

In accordance with an embodiment, the mapping is used to identify data targets during base data fetch for query evaluation. An iteration over input cells includes:

Creation symmetric region of targets from all participating dimensions.

Validation of intersections using solve order and other parameters.

Adding full intersection key to targets intersections map.

In accordance with an embodiment, the members-based mappings are converted to intersections-based target keys set. Each existing base data intersection passes through a reverse mappings analysis as described above and receives a set of multidimensional target cells that have at least one dependency with an existing data value.

In accordance with an embodiment, the execution of formulas can be performed using this target set without redundant iterations over formulas intersections not having any dependency data available. When formulas have complex multidimensional expressions, the cost of every redundant intersection execution becomes significant, and this approach minimizes the numbers of such intersections to zero level.

In accordance with an embodiment, the system utilizes dependency awareness of the complex formulas to transform the execution mode from top-down to bottom-up. This results in several advantages: using this multidimensional target set, the iteration formulas execution is performed over a dense, data driven region; and additionally, the query time does not depend anymore on the virtual query volume, but only on the asked data volume.

Context Dependent Conditional Formula

In accordance with an embodiment, multidimensional database formulas may have a form of conditional expressions with many branches evaluating some types of value expressions. For example:

```
IF (@ISMBR ("Jan")
    @SUMRANGE ("East",CHILDREN (@CURRMBR
        (PRODUCT))
ELSE IF (@ISMBR ("Dec"))
    @AVGRANGE        ("West",        @SIBLINGS
        (@CURRMBR (PRODUCT))
ENDIF
```

In accordance with an embodiment, such formulas have query context-based dependencies. For example, if a query is asking for ~1000 of Products, each one will be analyzed and evaluated based on its children or siblings in hierarchy for the intersection evaluation.

In accordance with an embodiment, in a situation where a query was directed to 100 Time members and 1000 Products, there will be 100,000 intersections to be processed for this Market formula. However, the dependent data values may exist only for 1000 intersections of Time and Product. Using the described approach results in a saving whereby 99,000 formulas executions can be actually prevented.

Figure 9:
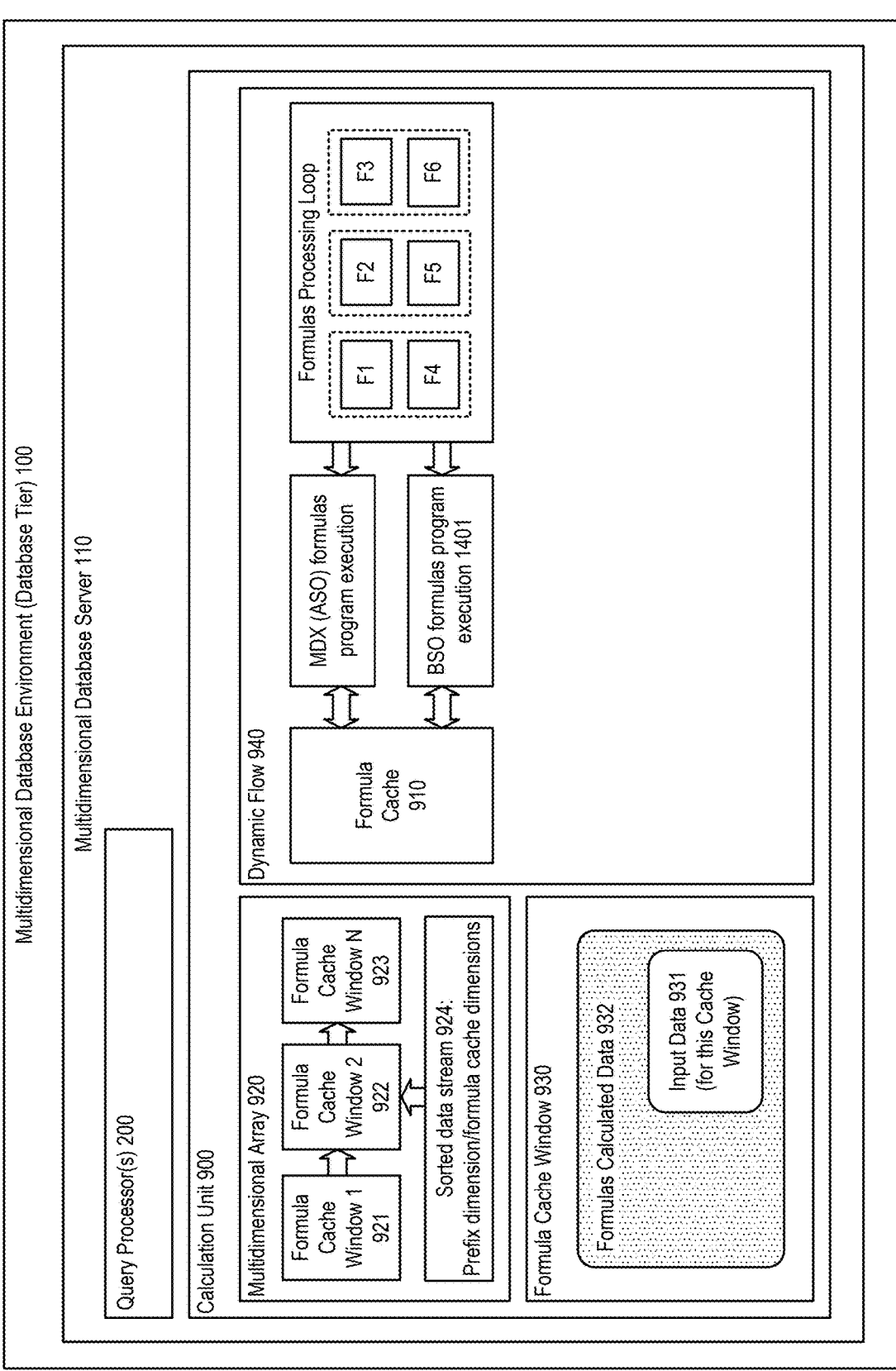
FIG. 9 illustrates a calculation unit, in accordance with an embodiment.

FIG. 9 illustrates a calculation unit, in accordance with an embodiment.

As illustrated in FIG. 9, in accordance with an embodiment, calculation units 900 (calculator units, calculators) evaluate formulas in a memory staging area operating as a formula cache 910.

The formula cache can comprise a multidimensional array 920, comprising, for example, a formula cache window 1 921, and formula cache window 2 922, through formula cache window N 923, allocated once for each calculation unit. Each cache window cycle clears this array, fills it with input data for a current prefix 924, and then the formulas are calculated. An expanded view of a formula cache window is shown at 930, showing the input data 931 used for each respective formula cache window 930.

In accordance with an embodiment, an implementation of a standard template library (STL) map array can be utilized, which is activated in situations where the cache required is too large in size.

In accordance with an embodiment, cached dimensions can comprise asked formulas and dependent dimensions that are determined utilizing a dependency analysis. The size of the formula cache array is the multiplied sizes of cached dimensions in the expanded odometer.

In accordance with an embodiment, prefix dimensions (i.e., dimensions that are not participating in formulas) can be defined. One or more combinations of prefix dimensions can define the formula cache window prefix.

In accordance with an embodiment, for simple formulas, only cache windows containing data are processed, thus saving processor time and memory space. For complex formulas (top-down)—conditional, context dependent and cross-dimensional formulas—if a dependencies expansion is not available—then all the cache prefixes have to be processed.

In accordance with an embodiment, each formula is executed in a loop through intersections with members of all remaining cached dimensions. A dynamic flow 940 process enables hybrid use of, for example, an Aggregate Storage Option (ASO), Block Storage Option (BSO), or other types of storage containers, and provides a common flow to process a received input query.

Figure 10:
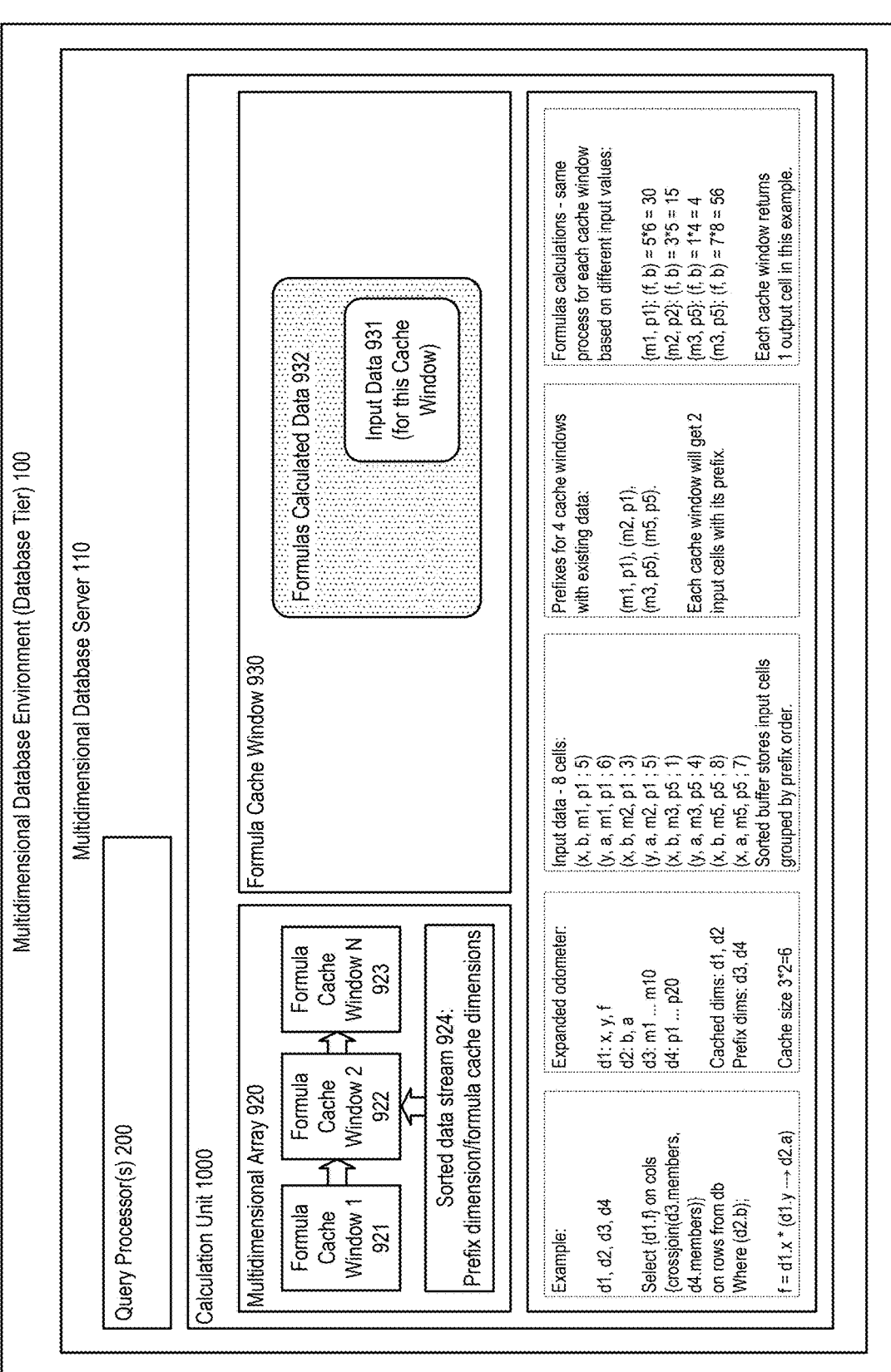
FIG. 10 shows a calculation unit for a formula cache, in accordance with an embodiment.

FIG. 10 shows a calculation unit for a formula cache, in accordance with an embodiment.

As illustrated in FIG. 10, in accordance with an embodiment, calculation units 1000 evaluate formulas in the formula cache, with the formula cache comprising, for example, a formula cache window 1 921, and formula cache window 2 922, through formula cache window N 923, allocated once for each calculation unit, as described above.

Figure 11:
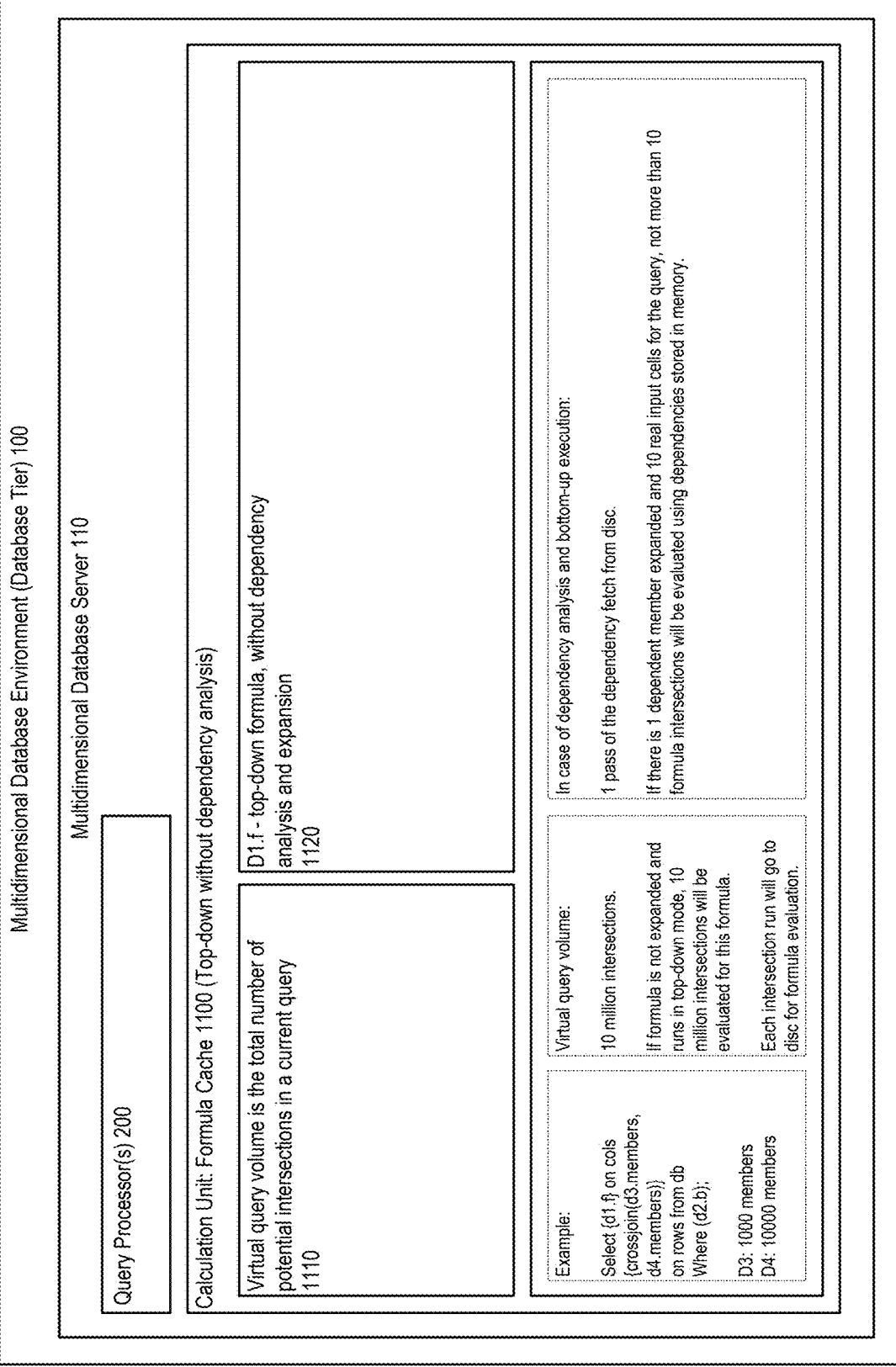
FIG. 11 illustrates a top-down versus bottom-up execution, in accordance with an embodiment.

FIG. 11 illustrates a top-down versus bottom-up execution, in accordance with an embodiment.

As illustrated in FIG. 11, in accordance with an embodiment, within a calculation unit 1100, a virtual query volume 1110 can comprise a total number of potential intersections in a current query.

In accordance with an embodiment, as depicted in FIG. 11, D1.f 1120 comprises a top-down formula without dependency analysis and expansion. For D1.f, a virtual query volume can comprise 10 million intersections for the given members D3 and D4 as shown. In situations where the formula is not expanded and runs in a top-down mode, then in this example 10 million intersections must be evaluated for the formula to run. Each intersection run will go to memory formula evaluation.

In accordance with an embodiment, conversely, if the D1.f runs with dependency analysis and in a bottom-up execution approach, one pass of the dependency analysis can be performed to fetch from memory. If there is 1 dependent member expanded and 10 real input cells for the query, then not more than 10 formula intersections must be evaluated using the dependencies stored in memory.

In accordance with an embodiment, a top-down approach means that formulas are executed for each asked query intersection, and during formulas execution it looks for values of dependent members in the staging area containing base data. A bottom-up approach means that formulas execution is performed in data driven mode—only intersections that have at least 1 dependency having data value in staging area are actually executed.

Formulas Execution Based on Dependencies Expansion

In accordance with an embodiment, using universal dependencies expansion, complex and originally "top-down" queries can be evaluated using an expanded input data for all dependencies stored in formula cache:

Dependencies are analyzed and expanded to odometer.
Only cache windows with existing data are processed.
Inside same cache window formulas are executed for all intersections with other cache dimensions.
Data can be scanned in one pass and available for all formulas in cache.

In accordance with an embodiment, this path of execution is efficient for many types of formulas since it significantly reduces I/O and all the execution process is in-memory with immediate access to all the dependent data. If many cross-dimensional dependencies exist or formulas for different dims are asked with big dimensions sizes in odometer, formula cache size may become very big and sparse.

Dependencies Expansion

Figure 12:
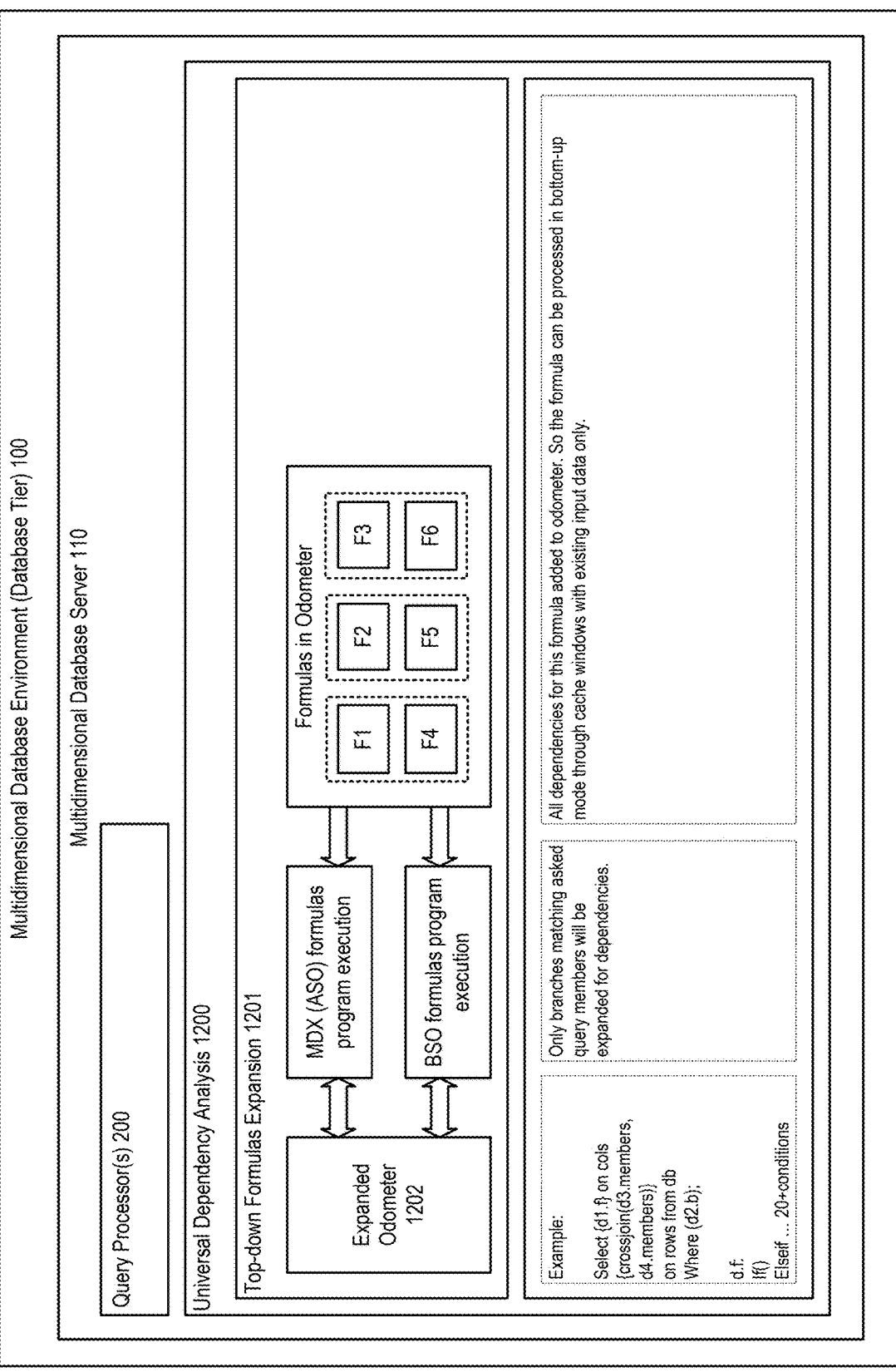
FIG. 12 illustrates dependency analysis, in accordance with an embodiment.

FIG. 12 illustrates dependency analysis, in accordance with an embodiment.

In accordance with an embodiment, FIG. 12 depicts a dependency analysis where a top-down formula is expanded in the top-down formulas expansion 1201, resulting in an expanded odometer 1202.

In accordance with an embodiment, multidimensional database universal dependencies analysis allows the systems and methods to retrieve/derive all required formulas dependencies at a preprocessing stage. Then, data for these dependencies are fetched during a cube data scan and stored in the base data staging area to be available formulas execution.

In accordance with an embodiment, formulas with complex dependencies chains can be expanded in this approach and processed in a bottom-up execution mode/method. This expansion at the top-down formula expansion 1201 results in an expanded odometer 1202.

In accordance with an embodiment, formula expansion can exactly fit a query context and allow the execution of the expanded formula on only asked "if" branches and/or context dependent calculation.

Dependencies Expansion Flow

In accordance with an embodiment, for a dependency expansion flow, each formula can be transformed to a program of statements execution using a state machine with entry points to every type of functions supported by multidimensional database formula languages, such as BSO and MDX ASO.

In accordance with an embodiment, each formula can be executed in two modes: data evaluation mode, and metadata extraction mode. For dependencies expansion, the metadata extraction mode of execution is used so that for each input member from the query odometer, the system can determine a proper set of dependent members that are required for specific member evaluation.

In accordance with an embodiment, as result of such expansion process there is a direct mapping between an asked query member to all its dependencies for any type of complex conditional formulas.

In accordance with an embodiment, this resulting mapping can be defined as array of vectors, when each odometer offset represents vector of dependencies for member located at specific odometer offset.

In accordance with an embodiment, the dependency expansion significantly reduces the number of I/O operations required for top-down formulas execution. However, in the case of big sparse virtual volumes of asked queries the top-down execution still has performance issues since dependencies awareness is not active in this mode and many redundant formulas executions may be performed. This I/O aspect of top-down executions can be solved by dependencies expansion, but not the cost of redundant evaluation of formulas that cannot return any data; and is instead addressed utilizing bottom-up formulas execution.

In accordance with an embodiment, a bottom-up approach is more efficient from the perspective of an amount of performed calculations, and the issue becomes more pertinent when the volume of virtual asked multidimensional region is huge, whereas dependencies data region is very sparse.

Bottom-Up Formulas Execution

FIG. 13 illustrates a virtual query volume vs. dependencies based volume cache, in accordance with an embodiment.

In accordance with an embodiment, FIG. 13 illustrates differences between a virtual query volume versus a dependencies-based cache volume 1300. A virtual query volume can comprise a total number of potential intersections in a current query 1301, while a dependency-based approach can calculate a cache volume using input data size for the query 1302, where the calculation is based upon a dependency analysis.

In accordance with an embodiment, the bottom-up execution algorithm is designed to achieve two primary goals:

Only target intersections that have dependent data are actually evaluated.
No dependency on virtual query volume-pure data driven execution mode.

In accordance with an embodiment, as shown in FIG. 13, a virtual query volume for the illustrated example can comprise 10 million intersections. If an input formula is not expanded and runs in top-down mode, then 10 million intersections will be evaluated for this formula. There is a small formula cache windows, but a full virtual query volume will be processed.

In accordance with an embodiment, conversely, a cache size can depend on formula definition. If formula has one dependent member x, the cache size can be 2. In the case of 10 real input cells for the query, 10 formula intersections will be evaluated.

Figure 14:
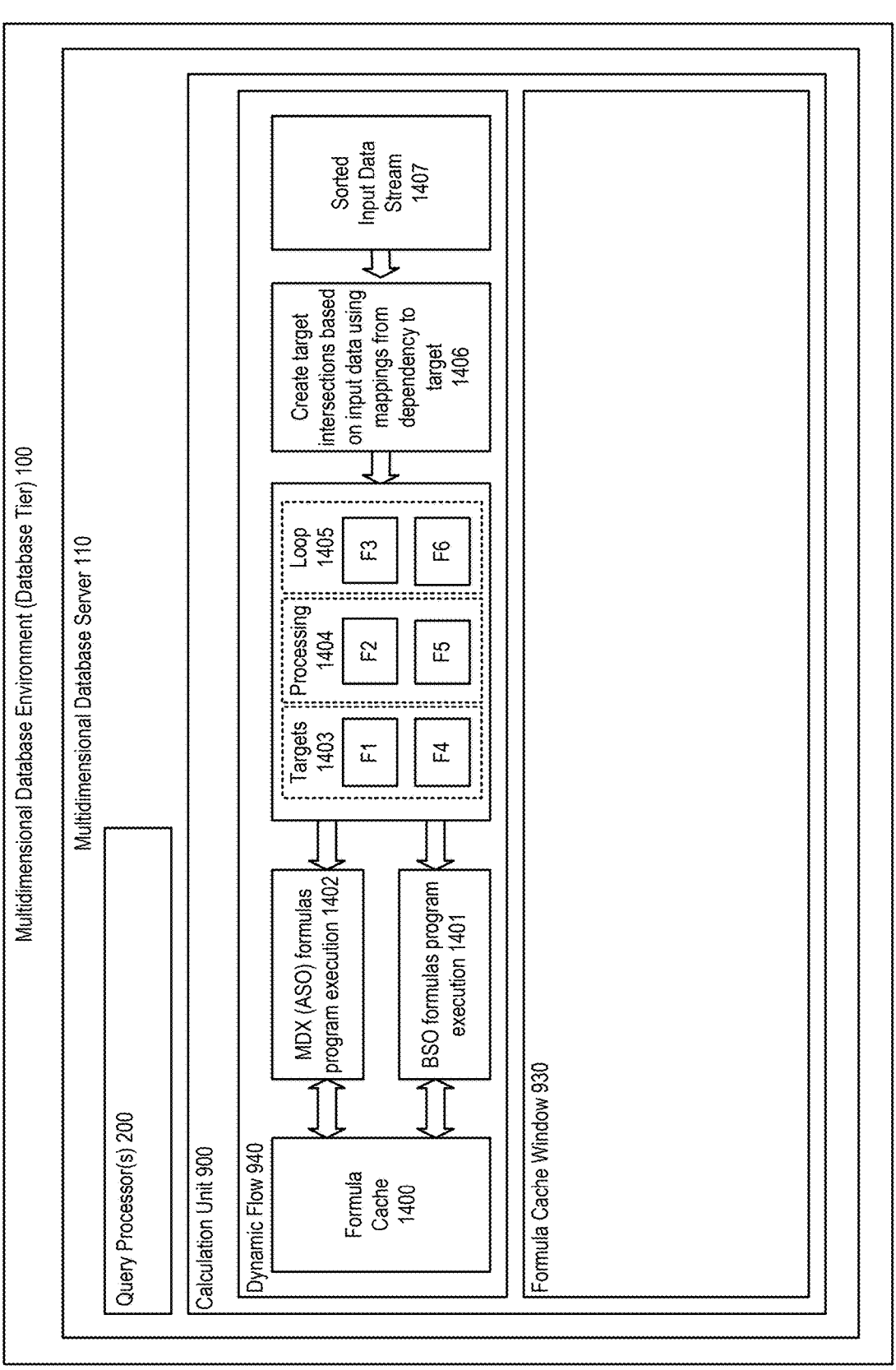
FIG. 14 illustrates bottom-up formulas execution, in accordance with an embodiment.

FIG. 14 illustrates bottom-up formulas execution, in accordance with an embodiment.

In accordance with an embodiment, a bottom-up execution method can achieve several goals, including evaluating only those target intersections that have dependent data, and reducing or eliminating dependency on a virtual query volume, as the bottom-up execution is a data driven execution mode.

In accordance with an embodiment, a sorted input data stream 1407 can be utilized to create target intersections based on input data using mappings from a previously performed dependency analysis to the target 1406.

In accordance with an embodiment, reverse mapping can be utilized in creating target intersections 1406. Using dependency analysis described above, the system creates reverse mappings of dependent members to their targets from different formulas expressions.

In accordance with an embodiment, after dependencies expansion, there are available mappings for each odometer member in those dimensions participating in formulas. For example:

$$m1 \rightarrow \{a1,b1,c4\}; \ m2 \rightarrow \{a2,b2,c4\}; \ m3 \rightarrow \{a3,b3,c4\}$$

In accordance with an embodiment, however, for bottom-up execution these mappings can be reversed to get mappings from dependencies to their targets. For example:

$$a1 \rightarrow \{m1\}, \ b1 \rightarrow \{m1\};$$

$$a2 \rightarrow \{m2\}, \ b2 \rightarrow \{m2\};$$

$$a3 \rightarrow \{m3\}, \ b3 \rightarrow \{m3\} \ c4 \rightarrow \{m1,m2,m3\}$$

In accordance with an embodiment, since c4 is dependent member for a few formulas, the reverse mapping can explicitly define that this dependency should be used in specified targets.

In accordance with an embodiment, these mappings are dimension based, so each dimension has its own set of such mappings after dependency analysis is completed, wherein the mapping contains links between dependent members to their target member lists. As described above, the map structure is members-based rather than intersections-based, since otherwise the sparse region overflow problem might be encountered at this level. Members-based mapping allows the systems to use a compact representation of the dependencies at the preprocessing stage, that can be applied later on the data processing stage.

In accordance with an embodiment, this reverse mapping can be used to identify data targets 1403 during a base data fetch operation for query evaluation.

In accordance with an embodiment, the iteration over input cells includes:

Creation symmetric region of targets from all participating dimensions;

Validation of intersections using solve order and other parameters;

Adding full intersection key to targets intersections map.

In accordance with an embodiment, members-based mappings are converted to intersections-based target keys set.

In accordance with an embodiment, the input cells stream can provide a sorted set of input cells in a current cache window. For each input cell, a process can be carried out. Such a process can include, for example:

1. Iterate over formula cache dimension members in current cell and extract the set of target members using reverse mapping. If there are 2 input cells with coordinates {a1; x1; z5}, {c4; x2; z8}, the target sets will can be as following: {m1}, {m1, m2, m3} correspondingly.

2. Replace input members with their targets. In case of multiple targets, multiple target cells can be produced from single input cell:

{a1; x1; z5}→→{m1; x1; z5} {c4;
x2; z8}→→{m1; x2; z8}, {m2; x2; z8}, {m3; x2; z8}

3. In the case of multiple dimensions dependencies create target intersections over Cartesian set of the target members from each dimension.

4. Encode each target intersection coordinates into target cell offsets inside formula cache. Since each cell is represented by a unique key, there can be multiples defined for each cached dimension. Using these multiples and the odometer offsets each cell receives its unique key.

5. Add the key to sorted set of targets offsets assigned to the appropriate formula. In this example, m1, m2, m3 are the formulas, so their sets will look as following:

m1: {m1; x1; z5}, {m1; x2; z8}
m2: {m2; x2; z8}
m3: {m3; x2; z8}

In accordance with an embodiment, the formulas execution loop 1405 can have an iterator which, instead of going through all formula cache 1400 intersection, iterates only over the sorted set of target keys during processing 1404. So, in the provided example:

m1 executes only 2 intersections: {m1; x1; z5}, {m1; x2; z8}.

m2 and m3 have only single intersection to be evaluated.

In accordance with an embodiment, this means that formula program execution (e.g., ASO 1402 or BSO 1401) can be triggered only for the non-empty targets, which is an actual evaluation in bottom-up mode.

In accordance with an embodiment, each existing base data intersection is passing through a reverse mappings analysis as described above and receives a set of multidimensional target cells that have at least 1 dependency with existing data value.

In accordance with an embodiment, from this point onward, the execution of formulas can be performed using this target set without redundant iterations over formulas intersections not having any dependency data available. When formulas have complex multidimensional expressions, the cost of every redundant intersection execution becomes significant, and this approach minimizes a number of such intersections to zero level.

In accordance with an embodiment, the system uses dependency awareness of the complex formulas to transform the execution mode from top-down to bottom-up. As described above, this results in several advantages: using this multidimensional target set, the iteration formulas execution is performed over a dense, data driven region; and additionally, the query time does not depend anymore on the virtual query volume, but only on the asked data volume.

Example Method

FIG. 15 is a flowchart of a method for bottom-up multidimensional data analysis, in accordance with an embodiment.

In accordance with an embodiment, at step 1510, the method can provide a computer that includes one or more microprocessors.

In accordance with an embodiment, at step 1520, the method can execute a multidimensional database server on the computer, wherein the multidimensional database comprises a plurality of dimensions, each of the plurality of dimensions comprising a plurality of members.

In accordance with an embodiment, at step 1530, the method can receive a query, the query being directed to the multidimensional database.

In accordance with an embodiment, at step 1540, the method can perform a dependency analysis.

In accordance with an embodiment, at step 1550, the method can execute the query in a bottom-up mode based at least in part upon results of the dependency analysis.

IV. Autonomous Data Dependent Bottom-up Query Processing

In accordance with an embodiment, the bottom-up query path functionality can be activated in autonomous mode.

Data Dependency

In accordance with an embodiment, the bottom-up query mode can be used only for formulas having a valid dependency on members with existing cube data. This means that the formula can return nonempty value only in case at least one of the dependent members has a cube value for the query.

The bottom-up mode cannot be used for formulas which can produce data on missing inputs on any of dependencies. In such cases, top-down execution mode is required. There are a few general categories of functions that require top-down execution:

Free constants dependencies: These are expressions based on constants that have no non-cumulative bindings to data values. For example:

$$y=x+5$$

If x has no data available, the expression still returns 5.

Data independent functions used: There are functions that may return data values based on same metadata evaluation and not dependent on data values. For example:

Count ( ) function with skip none option.

The above will return counts of metadata sets without relation to having cube data values.

Functions with data values-based metadata: Some special type of functions may use values of some members to identify and create name of other members using string concatenation functions. Such functions cannot be analyzed for dependencies before execution.

Formula Cache Data Density

In accordance with an embodiment, a query analyzer operates to identify the density of data in formula cache virtual subspace before making decision of bottom-up mode activation.

The bottom-up mode is not effective for high density data regions, because there is some redundancy of using reverse mapping and creation target intersections offsets. In cases of sparse data region, the redundancy is very low compared to the redundancy of a large number of formula program executions over empty data. However, in the case of a highly dense data region in the formula cache the situation might be opposite and bottom-up mode is not relevant for such formulas.

In accordance with an embodiment, the formula cache data density can be identified using available statistics of block density and extrapolation of these statistics on the formula cache region. The formula cache does not directly match the block dimensions definition, since it may contain multiple blocks or partial blocks inside.

In accordance with an embodiment, in a first step the block density rate will be main source of the estimation of formula cache density rate. In addition, each sparse dimension in formula cache and its size will be a factor of density rate reduction. Enhanced members statistics may be added during data load to make this evaluation have high precision density estimation.

The formula cache data density can be evaluated starting from the point all formula cache dimensions are identified. The density rate can be calculated using block and members-based data density statistics. The main goal of setting density parameter is to let the query analyzer choose between redundant empty cache execution weight and the time needed to identify target intersections based on each input cell coordinate.

Query Analyzer

In accordance with an embodiment, the query analyzer should be able to work effectively for queries with both types of formulas that support bottom-up mode or not. Each formula analysis will include validation of all the criteria described above. Data dependency related conditions can be identified during formula program parsing and compilation.

In accordance with an embodiment, the decision of execution mode can be performed in 2 steps:

Query level analysis for usage of bottom-up execution mode. It will check configuration settings allowing bottom-up mode execution and formula cache density rate related parameters.

Final decision of bottom-up mode usage is delegated to each formula object. Once the formula is identified to be eligible for bottom-up mode it will choose bottom-up formula cache iterator for the formula processing.

The final query formulas processing list may contain bottom-up mode formulas in combination with some exceptions which run in regular iteration mode and over empty cache windows.

While various embodiments of the present invention have been described above, it should be understood that they have been presented by way of example, and not limitation. The embodiments were chosen and described in order to explain the principles of the invention and its practical application. The embodiments illustrate systems and methods in which the present invention is utilized to improve the performance of the systems and methods by providing new and/or improved features and/or providing benefits such as reduced resource utilization, increased capacity, improved efficiency, and reduced latency.

In some embodiments, features of the present invention are implemented, in whole or in part, in a computer including a processor, a storage medium such as a memory and a network card for communicating with other computers. In some embodiments, features of the invention are implemented in a distributed computing environment in which one or more clusters of computers is connected by a network such as a Local Area Network (LAN), switch fabric network (e.g. InfiniBand), or Wide Area Network (WAN). The distributed computing environment can have all computers at a single location or have clusters of computers at different remote geographic locations connected by a WAN.

In some embodiments, features of the present invention are implemented, in whole or in part, in the cloud as part of, or as a service of, a cloud computing system based on shared, elastic resources delivered to users in a self-service, metered manner using Web technologies. There are five characteristics of the cloud (as defined by the National Institute of Standards and Technology: on-demand self-service; broad network access; resource pooling; rapid elasticity; and measured service. Cloud deployment models include: Public, Private, and Hybrid. Cloud service models include Software as a Service (Saas), Platform as a Service (PaaS), Database as a Service (DBaaS), and Infrastructure as a Service (IaaS). As used herein, the cloud is the combination of hardware, software, network, and web technologies which delivers shared elastic resources to users in a self-service, metered manner. Unless otherwise specified the cloud, as used herein, encompasses public cloud, private cloud, and hybrid cloud embodiments, and all cloud deployment models including, but not limited to, cloud SaaS, cloud DBaaS, cloud PaaS, and cloud IaaS.

In some embodiments, features of the present invention are implemented using, or with the assistance of hardware, software, firmware, or combinations thereof. In some embodiments, features of the present invention are implemented using a processor configured or programmed to execute one or more functions of the present invention. The processor is in some embodiments a single or multi-chip processor, a digital signal processor (DSP), a system on a chip (SOC), an application specific integrated circuit (ASIC), a field programmable gate array (FPGA) or other programmable logic device, state machine, discrete gate or transistor logic, discrete hardware components, or any combination thereof designed to perform the functions described herein. In some implementations, features of the present invention may be implemented by circuitry that is specific to a given function. In other implementations, the features may implemented in a processor configured to perform particular functions using instructions stored e.g. on a computer readable storage media.

In some embodiments, features of the present invention are incorporated in software and/or firmware for controlling the hardware of a processing and/or networking system, and for enabling a processor and/or network to interact with other systems utilizing the features of the present invention. Such software or firmware may include, but is not limited to, application code, device drivers, operating systems, virtual machines, hypervisors, application programming interfaces, programming languages, and execution environments/containers. Appropriate software coding can readily be prepared by skilled programmers based on the teachings of the present disclosure, as will be apparent to those skilled in the software art.

In some embodiments, the teachings herein can include a computer program product which is a non-transitory computer readable storage medium (media) having instructions stored thereon/in which can be used to program a computer to perform any of the processes of the pre-sent teachings. Examples of such storage mediums can include, but are not limited to, hard disk drives, hard disks, hard drives, fixed disks, ROMs, RAMs, EPROMs, EEPROMs, DRAMs, VRAMs, flash memory devices, or other types of storage media or devices suitable for non-transitory storage of instructions and/or data.

The foregoing description is not intended to be exhaustive or to limit the invention to the precise forms disclosed. Additionally, where embodiments of the present invention have been described using a particular series of transactions and steps, it should be apparent to those skilled in the art that the scope of the present invention is not limited to the described series of transactions and steps.

Further, where embodiments of the present invention have been described using a particular combination of hardware and software, it should be recognized that other combinations of hardware and software are also within the scope of the present invention.

Further, while the various embodiments describe particular combinations of features of the invention it should be understood that different combinations of the features will be apparent to persons skilled in the relevant art as within the scope of the invention such that features of one embodiment may incorporated into another embodiment. Moreover, it will be apparent to persons skilled in the relevant art that various additions, subtractions, deletions, variations, and other modifications and changes in form, detail, implementation and application can be made therein without departing from the spirit and scope of the invention. It is intended that the broader spirit and scope of the invention be defined by the following claims and their equivalents.

What is claimed is:

1. A system for bottom-up multidimensional data analysis, comprising:
   a computer that includes one or more microprocessors; and
   a multidimensional database server executing on the computer, wherein the multidimensional database comprises a plurality of dimensions, each of the plurality of dimensions comprising a plurality of members;
   wherein a query is received, the query being directed to the multidimensional database;
   wherein a dependency analysis is performed to determine a set of cells of the multidimensional database that have at least one dependency with an existing data value; and
   wherein the query is executed in a bottom-up mode based at least in part upon results of the dependency analysis, wherein the query executed in the bottom-up mode is executed across the set of cells determined by the dependency analysis as having at least one dependency with an existing data value.

2. The system of claim 1,
   wherein the dependency analysis determines a set of cells of the multidimensional database that have at least one dependency with an existing data value.

3. The system of claim 2,
   wherein the query executed in the bottom-up mode is executed across only the set of cells determined by the dependency analysis.

4. The system of claim 1,
   wherein the query comprises at least one conditional expression.

5. The system of claim 4,
   wherein the query comprising the at least one conditional expression has an initial cell query determined by a set of dimensions associated with the query.

6. The system of claim 5,
   wherein the determined set of cells of the multidimensional database is smaller than the initial cell query size determined by the set of dimensions associated with the query.

7. The system of claim 1,
   wherein, based upon the dependency analysis, one or more reverse mappings of dependent member to target are generated.

8. The system of claim 1, wherein the dependency analysis generates a reverse mapping of dependent members to their targets from different formulas expressions, wherein the mappings contain links between the dependent members to their target member lists.

9. The system of claim 8, wherein the mappings are converted to an intersections-based target keys set, wherein each existing base data intersection receives a set of multi-dimensional target cells that have at least one dependency with an existing data value.

10. A method for bottom-up multidimensional data analysis, comprising:

providing a computer that includes one or more microprocessors;

executing a multidimensional database server on the computer, wherein the multidimensional database comprises a plurality of dimensions, each of the plurality of dimensions comprising a plurality of members;

receiving a query, the query being directed to the multidimensional database;

performing a dependency analysis to determine a set of cells of the multidimensional database that have at least one dependency with an existing data value; and executing the query in a bottom-up mode based at least in part upon results of the dependency analysis, wherein the query executed in the bottom-up mode is executed across the set of cells determined by the dependency analysis as having at least one dependency with an existing data value.

11. The method of claim 10, wherein the query comprises at least one conditional expression.

12. The method of claim 11, wherein the query comprising the at least one conditional expression has an initial cell query determined by a set of dimensions associated with the query.

13. The method of claim 12, wherein the determined set of cells of the multidimensional database is smaller than the initial cell query size determined by the set of dimensions associated with the query.

14. The method of claim 10, wherein, based upon the dependency analysis, one or more reverse mappings of dependent member to target are generated.

15. The method of claim 10, wherein the dependency analysis generates a reverse mapping of dependent members to their targets from different formulas expressions, wherein the mappings contain links between the dependent members to their target member lists.

16. The method of claim 15, wherein the mappings are converted to an intersections-based target keys set, wherein each existing base data intersection receives a set of multi-dimensional target cells that have at least one dependency with an existing data value.

17. A non-transitory computer readable storage medium having instructions thereon for bottom-up multidimensional data analysis, which when read and executed cause a computer comprising one or more microprocessors to perform steps comprising:

executing a multidimensional database server on the computer, wherein the multidimensional database comprises a plurality of dimensions, each of the plurality of dimensions comprising a plurality of members;

receiving a query, the query being directed to the multidimensional database;

performing a dependency analysis to determine a set of cells of the multidimensional database that have at least one dependency with an existing data value; and executing the query in a bottom-up mode based at least in part upon results of the dependency analysis, wherein the query executed in the bottom-up mode is executed across the set of cells determined by the dependency analysis as having at least one dependency with an existing data value.

18. The non-transitory computer readable storage medium of claim 17, wherein the query comprises at least one conditional expression.

19. The non-transitory computer readable storage medium of claim 18, wherein the query comprising the at least one conditional expression has an initial cell query determined by a set of dimensions associated with the query.

20. The non-transitory computer readable storage medium of claim 19, wherein the determined set of cells of the multidimensional database is smaller than the initial cell query size determined by the set of dimensions associated with the query.

\* \* \* \* \*